US006950874B2

(12) United States Patent
Chang et al.

(10) Patent No.: US 6,950,874 B2
(45) Date of Patent: Sep. 27, 2005

(54) METHOD AND SYSTEM FOR MANAGEMENT OF RESOURCE LEASES IN AN APPLICATION FRAMEWORK SYSTEM

(75) Inventors: Ching-Jye Chang, Austin, TX (US); Lorin Evan Ullman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 704 days.

(21) Appl. No.: 09/738,307

(22) Filed: Dec. 15, 2000

(65) Prior Publication Data

US 2002/0078213 A1 Jun. 20, 2002

(51) Int. Cl.[7] ....................... G06F 15/16; G06F 15/173; H04L 12/26; H04L 12/28

(52) U.S. Cl. ....................... 709/229; 709/223; 709/224; 709/225; 709/226; 709/227; 709/239; 709/249; 370/230; 370/235; 370/254

(58) Field of Search ................................ 709/223–229, 709/203, 220, 233–235, 239, 240, 244, 249; 370/229, 230, 235, 237, 242, 254

(56) References Cited

U.S. PATENT DOCUMENTS

| | | | | |
|---|---|---|---|---|
| 5,214,778 A | * | 5/1993 | Glider et al. | 714/2 |
| 5,239,649 A | * | 8/1993 | McBride et al. | 718/105 |
| 5,832,529 A | | 11/1998 | Wollrath et al. | 707/206 |
| 5,838,968 A | * | 11/1998 | Culbert | 718/104 |

(Continued)

OTHER PUBLICATIONS

Garg, Rahul and Saran, Huzur. "Fair Bandwidth Sharing Among Virtual Networks: A Capacity Resizing Approach," IEEE INFOCOM 2000, vol. 1, Mar. 26–30, 2000, Pp. 255–264.*

Yin, Jian, et al. "Volume Leases for Consistency in Large–Scale Systems," IEEE Transactions on Knowledge and Data Engineering, vol. 11, Issue 4, Jul.–Aug. 1999, pp. 563–576.*

Schelen, Olov, et al. "Performance of QoS Agents for Provisioning Network Resources," Seventh Intl. Workshop on Quality of Service, May 31–Jun. 4, 1999, pp. 17–26.*

Chen, Y. C. "Least Required Bandwidth in VP–Based ATM Networks," Intl. Conference on Information, Communications and Signal Processing, vol. 3, Sep. 9–12, 1997, pp. 1504–1507.*

*Primary Examiner*—Melvin H. Pollack
(74) *Attorney, Agent, or Firm*—Jeffrey S. LaBaw; Joseph R. Burwell

(57) ABSTRACT

A method, system, apparatus, and computer program product are presented for management of resource leases within a distributed data processing system. A resource manager receives a lease request from a requester for a resource in which the lease request has a requested lease period. In response to receiving the lease request, the resource manager secures leases along a logical circuit of resources through the distributed data processing system. The resource manager requests leases from other resource managers along the data path that comprises the logical circuit because use of the requested resource requires use of other resources. After securing leases on a logical circuit of resources, the resource manager returns a lease grant for the resource to the requester. If the system detects oversubscribed conditions and/or error conditions, the system can adjust the pending leases in an appropriate manner, such as terminating a lease, adjusting the lease period of a lease, and the like.

12 Claims, 12 Drawing Sheets

U.S. PATENT DOCUMENTS

| | | | | | |
|---|---|---|---|---|---|
| 5,898,870 | A | * | 4/1999 | Okuda et al. | 718/104 |
| 6,009,103 | A | | 12/1999 | Woundy | 370/401 |
| 6,016,500 | A | | 1/2000 | Waldo et al. | 707/202 |
| 6,058,426 | A | | 5/2000 | Godwin et al. | 709/229 |
| 6,085,241 | A | * | 7/2000 | Otis | 709/223 |
| 6,108,654 | A | | 8/2000 | Chan et al. | 707/8 |
| 6,202,066 | B1 | * | 3/2001 | Barkley et al. | 707/9 |
| 6,212,565 | B1 | * | 4/2001 | Gupta | 709/229 |
| 6,243,716 | B1 | * | 6/2001 | Waldo et al. | 707/202 |
| 6,247,026 | B1 | * | 6/2001 | Waldo et al. | 707/206 |
| 6,252,886 | B1 | * | 6/2001 | Schwager et al. | 370/443 |
| 6,321,272 | B1 | * | 11/2001 | Swales | 709/250 |
| 6,332,140 | B1 | * | 12/2001 | Rhine | 707/9 |
| 6,449,648 | B1 | * | 9/2002 | Waldo et al. | 709/226 |
| 6,519,615 | B1 | * | 2/2003 | Wollrath et al. | 707/206 |
| 6,587,877 | B1 | * | 7/2003 | Douglis et al. | 709/224 |
| 6,625,650 | B2 | * | 9/2003 | Stelliga | 709/226 |
| 6,640,248 | B1 | * | 10/2003 | Jorgensen | 709/226 |
| 6,651,242 | B1 | * | 11/2003 | Hebbagodi et al. | 717/127 |
| 6,658,010 | B1 | * | 12/2003 | Enns et al. | 370/401 |
| 6,760,306 | B1 | * | 7/2004 | Pan et al. | 370/230 |
| 6,765,872 | B1 | * | 7/2004 | Tazaki | 370/235 |
| 6,792,466 | B1 | * | 9/2004 | Saulpaugh et al. | 709/229 |

* cited by examiner

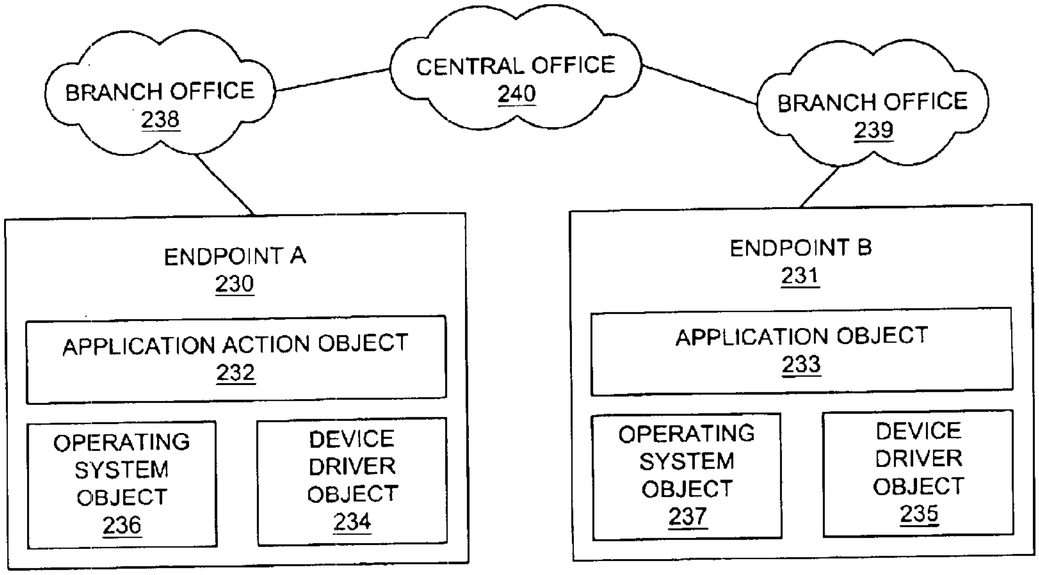
*FIG. 2D*
*FIG. 2E*
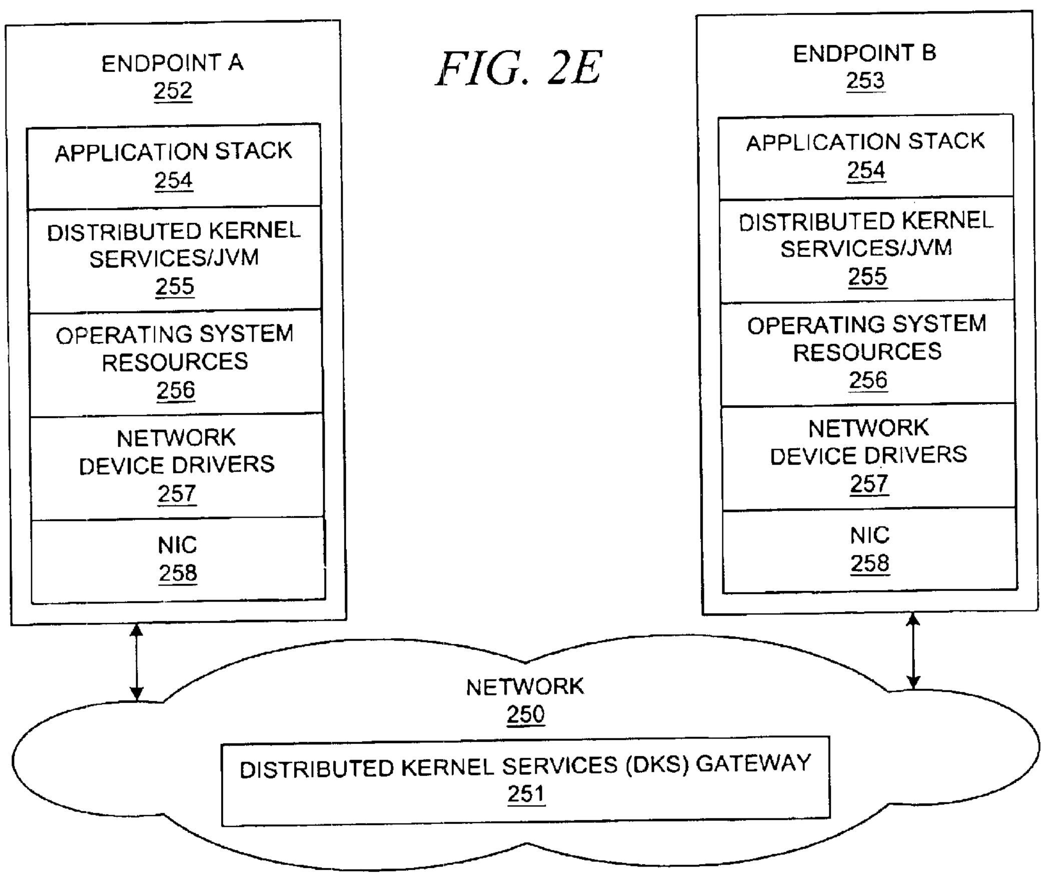

```
CLASS  ACTION_OBJECT  {

        // CONSTRUCTOR
        ACTION_OBJECT( LONG IPADDRESS, SHORT VIRTUALPRIVATENETWORKADDRESS )
                THROWS BADADDRESS ...
        .
        .
        .
        VOID PERFORMACTION( ) // EXECUTES ACTION METHOD
  .
  .
  .
}
```

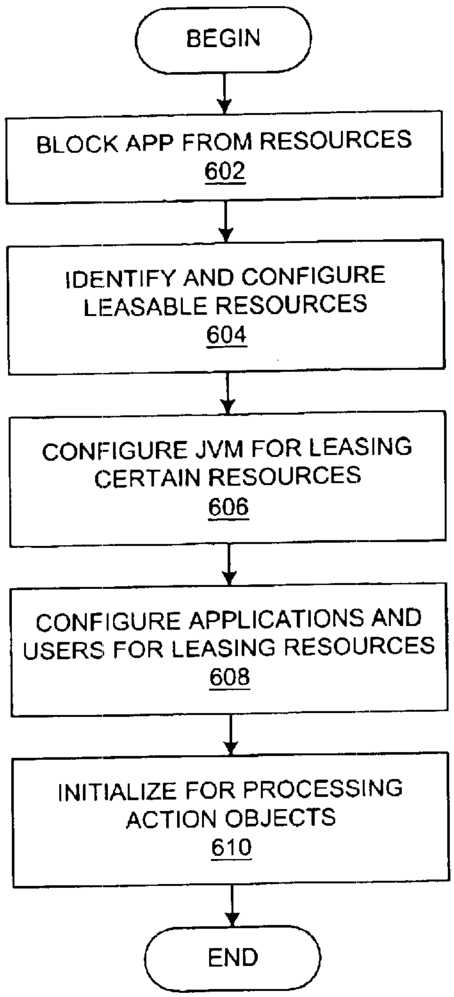

*FIG. 6A*

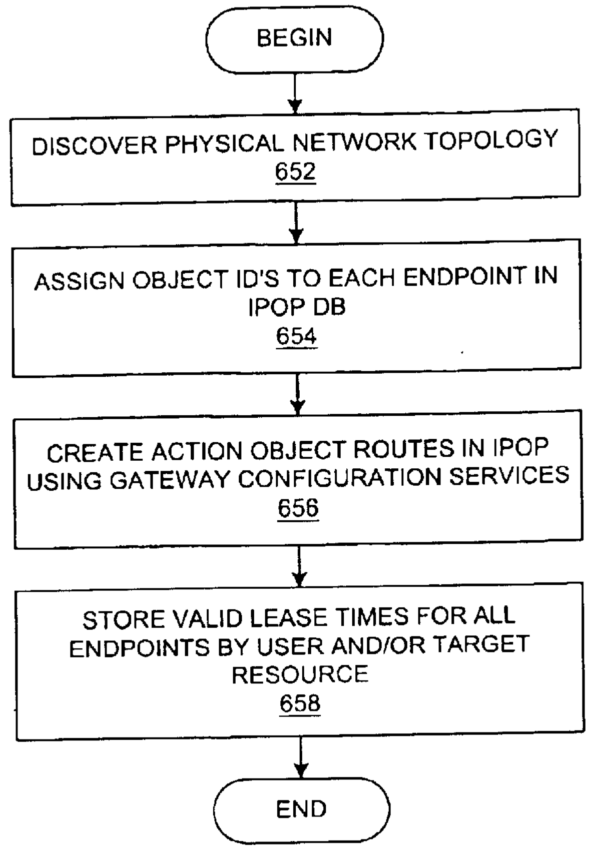

*FIG. 6B*

```
CLASS  LEASE_ACTION_OBJECT  EXTENDS ACTION_OBJECT {

        // CONSTRUCTOR
        LEASE_ACTION_OBJECT( LONG IPADDRESS,
                             SHORT VIRTUALPRIVATENETWORKADDRESS, INT LEASETIME)
              THROWS         BADADDRESS, LEASETIMENOTACCEPTABLE_EXCEPTION,
                             LEASEBANDWIDTHMUSTBEREDUCED_EXCEPTION,
                             LEASETERMINATED_EXCEPTION, ...
        .
        .
        .
        PUBLIC INT LEASETIME;        // STORE LEASE TIME

        STATIC FINAL INFINITELEASETIME = -1;
        STATIC FINAL ZEROLEASETIME = 0;
  .
  .
  .
}
```

*FIG. 7C*

```
CLASS LEASETIMENOTACCEPTABLE_EXCEPTION EXTENDS EXCEPTION {
 .
 .
 .
}
CLASS LEASEBANDWIDTHMUSTBEREDUCED_EXCEPTION EXTENDS EXCEPTION {
 .
 .
 .
}
CLASS LEASETERMINATED_EXCEPTION EXTENDS EXCEPTION {
 .
 .
 .
}
```

```
XYZ_APPLICATION_METHOD {
        LEASE_ACTION_OBJECT      MYLEASEDACTIONOBJECT = NULL;
        .
        .
        .
        MYLEASEDACTIONOBJECT = NEW LEASEDACTIONOBJECT( . . . );
        MYLEASEDACTIONOBJECT.PERFORMACTION( . . . );
  .
  .
  .
}
```

METHOD AND SYSTEM FOR MANAGEMENT OF RESOURCE LEASES IN AN APPLICATION FRAMEWORK SYSTEM

BACKGROUND OF THE INVENTION

1. Field of the Invention

The present invention relates to an improved data processing system and, in particular, to a method and system for multiple computer or process coordinating. Still more particularly, the present invention provides a method and system for network resource management.

2. Description of Related Art

Technology expenditures have become a significant portion of operating costs for most enterprises, and businesses are constantly seeking ways to reduce information technology (IT) costs. This has given rise to an increasing number of outsourcing service providers, each promising, often contractually, to deliver reliable service while offloading the costly burdens of staffing, procuring, and maintaining an IT organization. While most service providers started as network pipe providers, they are moving into server outsourcing, application hosting, and desktop management. For those enterprises that do not outsource, they are demanding more accountability from their IT organizations as well as demanding that IT is integrated into their business goals. In both cases, "service level agreements" have been employed to contractually guarantee service delivery between an IT organization and its customers. As a result, IT teams now require management solutions that focus on and support "business processes" and "service delivery" rather than just disk space monitoring and network pings.

IT solutions now require end-to-end management that includes network connectivity, server maintenance, and application management in order to succeed. The focus of IT organizations has turned to ensuring overall service delivery and not just the "towers" of network, server, desktop, and application. Management systems must fulfill two broad goals: a flexible approach that allows rapid deployment and configuration of new services for the customer; and an ability to support rapid delivery of the management tools themselves. A successful management solution fits into a heterogeneous environment, provides openness with which it can knit together management tools and other types of applications, and a consistent approach to managing all of the IT assets.

With all of these requirements, a successful management approach will also require attention to the needs of the staff within the IT organization to accomplish these goals: the ability of an IT team to deploy an appropriate set of management tasks to match the delegated responsibilities of the IT staff; the ability of an IT team to navigate the relationships and effects of all of their technology assets, including networks, middleware, and applications; the ability of an IT team to define their roles and responsibilities consistently and securely across the various management tasks; the ability of an IT team to define groups of customers and their services consistently across the various management tasks; and the ability of an IT team to address, partition, and reach consistently the managed devices.

Many service providers have stated the need to be able to scale their capabilities to manage millions of devices. When one considers the number of customers in a home consumer network as well as pervasive devices, such as smart mobile phones, these numbers are quickly realized. Significant bottlenecks appear when typical IT solutions attempt to support more than several thousand devices.

Given such network spaces, a management system must be very resistant to failure so that service attributes, such as response time, uptime, and throughput, are delivered in accordance with guarantees in a service level agreement. In addition, a service provider may attempt to support as many customers as possible within a single system. The service provider's profit margins may materialize from the ability to bill the usage of common IT assets to multiple customers.

However, the service provider must be able to support contractual agreements on an individual basis. In order to do so, management systems must be able to support granularity on a shared backbone of equipment and services as well as a set of measurements that apply very directly with each customer. By providing this type of granularity, a robust management system can enable a service provider to enter into quality-of-service (QOS) agreements with its customers.

Hence, there is a direct relationship between the ability of a management system to provide certain fault-tolerant functionality and the ability of a service provider using the management system to guarantee different levels of service. Preferably, the management system can replicate services, detect faults within a service, restart services, and reassign work to a replicated service. By implementing a common set of interfaces across all of their services, each service developer gains the benefits of system robustness. A well-designed, component-oriented, highly distributed system can easily accept a variety of services on a common infrastructure with built-in fault-tolerance and levels of service.

Distributed data processing systems with thousands of nodes are known in the prior art. The nodes can be geographically dispersed, and the overall computing environment can be managed in a distributed manner. The managed environment can be logically separated into a series of loosely connected managed regions in which each region has its own management server for managing local resources. The management servers coordinate activities across the enterprise and permit remote site management and operation. Local resources within one region can be exported for the use of other regions in a variety of manners.

Managed regions within a highly distributed network may attempt to incorporate fault-tolerance with firewalls that attempt to limit any damage that might be caused by harmful entities. A firewall can prevent certain types of network traffic from reaching devices that reside on the internal protected network. For example, the firewall can examine the frame types or other information of the received data packets to stop certain types of information that has been previously determined to be harmful, such as virus probes, broadcast data, pings, etc. As an additional example, entities that are outside of the internal network and lack the proper authorization may attempt to discover, through various methods, the topology of the internal network and the types of resources that are available on the internal network in order to plan electronic attacks on the network. Firewalls can prevent these types of discovery practices.

While firewalls may prevent certain entities from obtaining information from the protected internal network, firewalls may also present a barrier to the operation of legitimate, useful processes. In order to ensure a predetermined level of service, benevolent processes may need to operate on both the external network and the protected internal network. For example, a customer system is more efficiently managed if the management software can dynamically detect and dynamically configure hardware resources as they are installed, rebooted, etc. Various types of discovery processes, status polling, status gathering, etc., may be used to get information about the customer's large, dynamic, distributed processing system. This information is then used to ensure that QOS guarantees are being fulfilled. However, firewalls might block these system processes, especially discovery processes.

In order to provide more system functionality such that firewalls do not block benevolent data traffic, systems can be built and/or configured in a variety of ways so that secure communication can still be accomplished. A system may comprise static, dedicated pieces of code that operate by using dedicated ports. Each software component communicates with another component by knowing the dedicated port number of the other component. However, memory and other system constraints would eventually limit the number and management of dedicated ports, and the dynamic reconfiguration of port numbers can be quite difficult.

In order to fulfill QOS guarantees, a management system needs to provide an infrastructure such that resources are fairly distributed. A requesting application can request and obtain sole control of a target resource, execute a session with another software component that has responsibility for the desired target resource, and then release the target resource. However, the system management software then has the difficulty of assuring that requesting components receive equitable treatment in the sharing of resources, which can be quite difficult to accomplish in a large, distributed computing environment consisting of hundreds of thousands of devices.

The distributed computing system can be implemented as a closed system that is relatively assured of being free from mischievous network-related attacks. The target resource can then remain in an "open" state available for all requesters on a first-come, first-serve basis, with some type of "honor system" assumed to be followed by devices within the closed system. Many real-time operating systems or embedded real-time processor controllers assume that they operate within this type of closed environment in order to guarantee certain quality-of-service objectives. With the move to more open networks that are interconnected in some manner with the Internet, however, it is becoming increasingly difficult and less desirable for an enterprise to pursue such networks. With a system comprising hundreds of thousands of devices, it is unrealistic to assume that the system can remain in a protected, "closed" states.

Meeting QOS objectives in a highly distributed system can be quite difficult. Various resources throughout the distributed system can fail, and the failure of one resource might impact the availability of another resource. In a highly distributed system, the workload across the entire system may be fairly predictable, but workloads change in a very dynamic manner, and network bandwidth and network traffic can be unpredictable.

Therefore, it would be particularly advantageous to provide a method and system that provides access to target resources in a fair yet highly distributed manner. It would be particularly advantageous for the target resources to be dynamically discoverable and flexibly addressable and utilizable.

SUMMARY OF THE INVENTION

A method, system, apparatus, and computer program product are presented for management of resource leases within a distributed data processing system. The system may comprise a gateway-endpoint organization that allows for a highly distributed service management architecture. Services within this framework enable resource consumers to address resources and use resources throughout the distributed system. The application framework is preferably implemented in an object-oriented manner. Resources are represented as objects. A request for a target resource is instantiated as an action object that is both protocol-independent and network-route-unaware. The action object is addressed to the target resource, and the distributed framework routes the action object through the system so that the appropriate gateway receives the action object and ensures its completion and the return of status from its execution, whether or not the action object completes successfully. The distributed nature of the gateways and their services allow logical routes to be dynamically determined for the action objects. As hardware and/or software failures occur, the action objects can be rerouted, thereby providing fault-tolerance within the system.

When a request for a resource is initiated, the management system ensures the availability of all of the resources along the logical route that are required for the successful completion of the target resource. In a highly distributed system, the distribution of the workload within the system may change constantly. If the system workload shifts in a manner that affects the successful completion of an action object, the manner in which active action objects are completed can be altered in order to redistribute the workload and to attempt to complete the active action objects successfully.

In particular, the present invention is directed to a method, system, apparatus, and computer program product for management of resource leases within a distributed data processing system. A resource manager receives a lease request from a requester for a resource in which the lease request has a requested lease period. In response to receiving the lease request, the resource manager secures leases along a logical circuit of resources through the distributed data processing system. The resource manager requests leases from other resource managers along the data path that comprises the logical circuit because use of the requested resource requires use of other resources. After securing leases on a logical circuit of resources, the resource manager returns a lease grant for the resource to the requester. If the system detects oversubscribed conditions and/or error conditions, the system can adjust the pending leases in an appropriate manner, such as terminating a lease, adjusting the lease period of a lease, and the like.

With the lease management system provided by the present invention, the consumer of a resource can inform the system of the desire to lease a target resource for a particular period of time at a particular level of service. As the workload within the system changes or as hardware and/or software fails within the system, the resource consumer can be notified that the terms of the lease are being altered. In this manner, the resource consumer is provided with at least a minimal amount of notification that the desired usage of the resource is being changed.

With the present invention, the distributed framework allows the system to have the flexibility to manage the leases rather than directly managing the target resources. In most prior art systems, the distributed system might provide point-to-point or one-to-one access to a target resource, e.g., through a first-come, first-serve mechanism, a round-robin mechanism, or some type of priority scheme. In contrast, having the ability to achieve different levels of service such that the service provider that operates the management system can provide quality-of-service guarantees to its customers significantly enhances a distributed data processing system.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 2D is a diagram depicting a logical configuration of software objects residing within a hardware network similar to that shown in FIG. 2A;

FIG. 2E is a diagram depicting the logical relationships between components within a system management framework that includes two endpoints and a gateway;

FIG. 5 is a block diagram showing the IPOP service in more detail;

FIGS. 6A–6B are flowcharts that show processes for configuring and initializing for lease management of resources within a distributed computing environment such as that shown in FIGS. 2D–2E; and FIG. 7A is a flowchart showing a process for requesting and obtaining resource leases;

FIGS. 7B–7E are portions of simplified pseudo-code depicting a manner in which action objects and lease action objects can be implemented;

FIG. 7F is a flowchart depicting a more detailed process of the manner in which a lease is provided to a requester;

DETAILED DESCRIPTION OF THE INVENTION

Figure 1A:
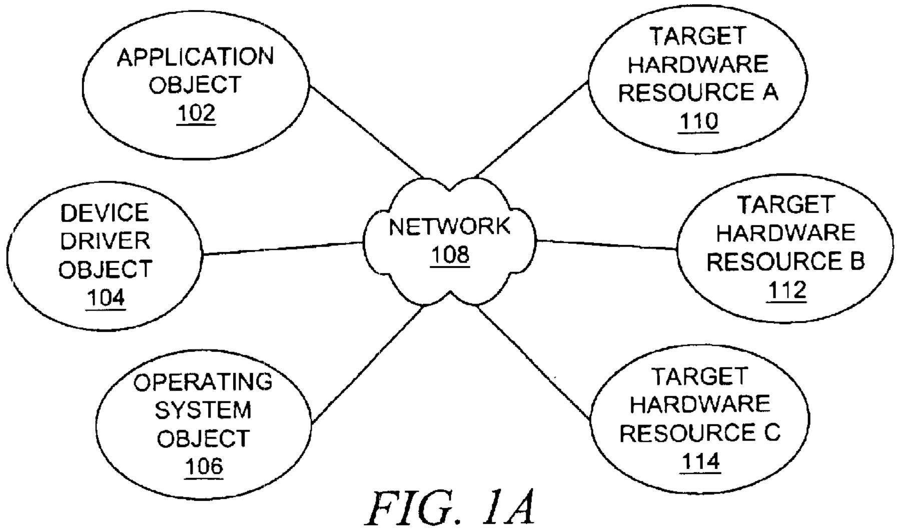
FIG. 1A is a diagram depicting a known logical configuration of software and hardware resources.

With reference now to FIG. 1A, a diagram depicts a known logical configuration of software and hardware resources. In this example, the software is organized in an object-oriented system. Application object 102, device driver object 104, and operating system object 106 communicate across network 108 with other objects and with hardware resources 110–114.

In general, the objects require some type of processing, input/output, or storage capability from the hardware resources. The objects may execute on the same device to which the hardware resource is connected, or the objects may be physically dispersed throughout a distributed computing environment. The objects request access to the hardware resource in a variety of manners, e.g. operating system calls to device drivers. Hardware resources are generally available on a first-come, first-serve basis in conjunction with some type of arbitration scheme to ensure that the requests for resources are fairly handled. In some cases, priority may be given to certain requesters, but in most implementations, all requests are eventually processed.

Figure 1B:
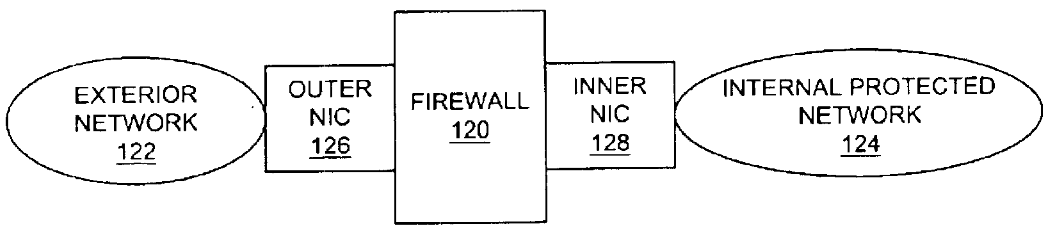
FIG. 1B is a block diagram depicting a known configuration of software and/or hardware network resources.

With reference now to FIG. 1B, a block diagram depicts a known configuration of software and/or hardware network resources. A computer-type device is functioning as firewall 120, which is usually some combination of software and hardware, to monitor data traffic from exterior network 122 to internal protected network 124. Firewall 120 reads data received by network interface card (NIC) 126 and determines whether the data should be allowed to proceed onto the internal network. If so, then firewall 120 relays the data through NIC 128. The firewall can perform similar processes for outbound data to prevent certain types of data traffic from being transmitted, such as HTTP (Hypertext Transport Protocol) Requests to certain domains.

More importantly for this context, the firewall can prevent certain types of network traffic from reaching devices that reside on the internal protected network. For example, the firewall can examine the frame types or other information of the received data packets to stop certain types of information that has been previously determined to be harmful, such as virus probes, broadcast data, pings, etc. As an additional example, entities that are outside of the internal network and lack the proper authorization may attempt to discover, through various methods, the topology of the internal network and the types of resources that are available on the internal network in order to plan electronic attacks on the network. Firewalls can prevent these types of discovery practices.

The present invention provides a methodology for discovering available resources and operating a framework for leasing these resources in a fair yet distributed manner. The manner in which the lease management is performed is described further below in more detail after the description of the preferred embodiment of the distributed computing environment in which the present invention operates.

Figure 2A:
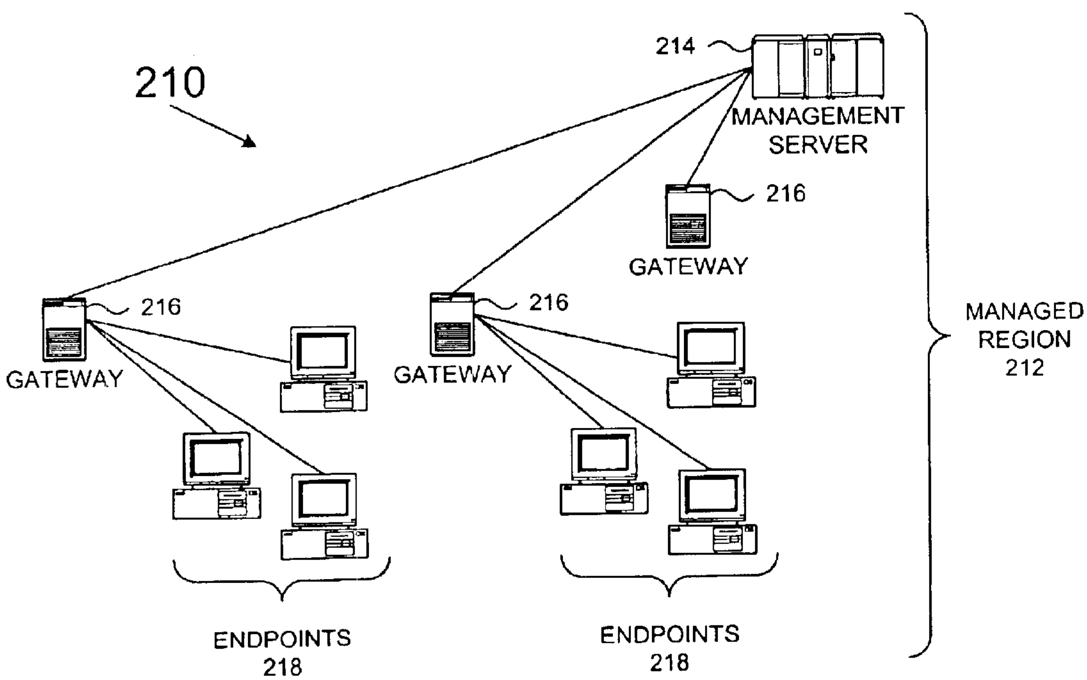
FIG. 2A is simplified diagram illustrating a large distributed computing enterprise environment in which the present invention is implemented.

With reference now to FIG. 2A, the present invention is preferably implemented in a large distributed computer environment 210 comprising up to thousands of "nodes". The nodes will typically be geographically dispersed and the overall environment is "managed" in a distributed manner. Preferably, the managed environment is logically broken down into a series of loosely connected managed regions (MRs) 212, each with its own management server 214 for managing local resources with the managed region. The network typically will include other servers (not shown) for carrying out other distributed network functions. These include name servers, security servers, file servers, thread servers, time servers and the like. Multiple servers 214 coordinate activities across the enterprise and permit remote management and operation. Each server 214 serves a number of gateway machines 216, each of which in turn support a plurality of endpoints/terminal nodes 218. The server 214 coordinates all activity within the managed region using a terminal node manager at server 214.

Figure 2B:
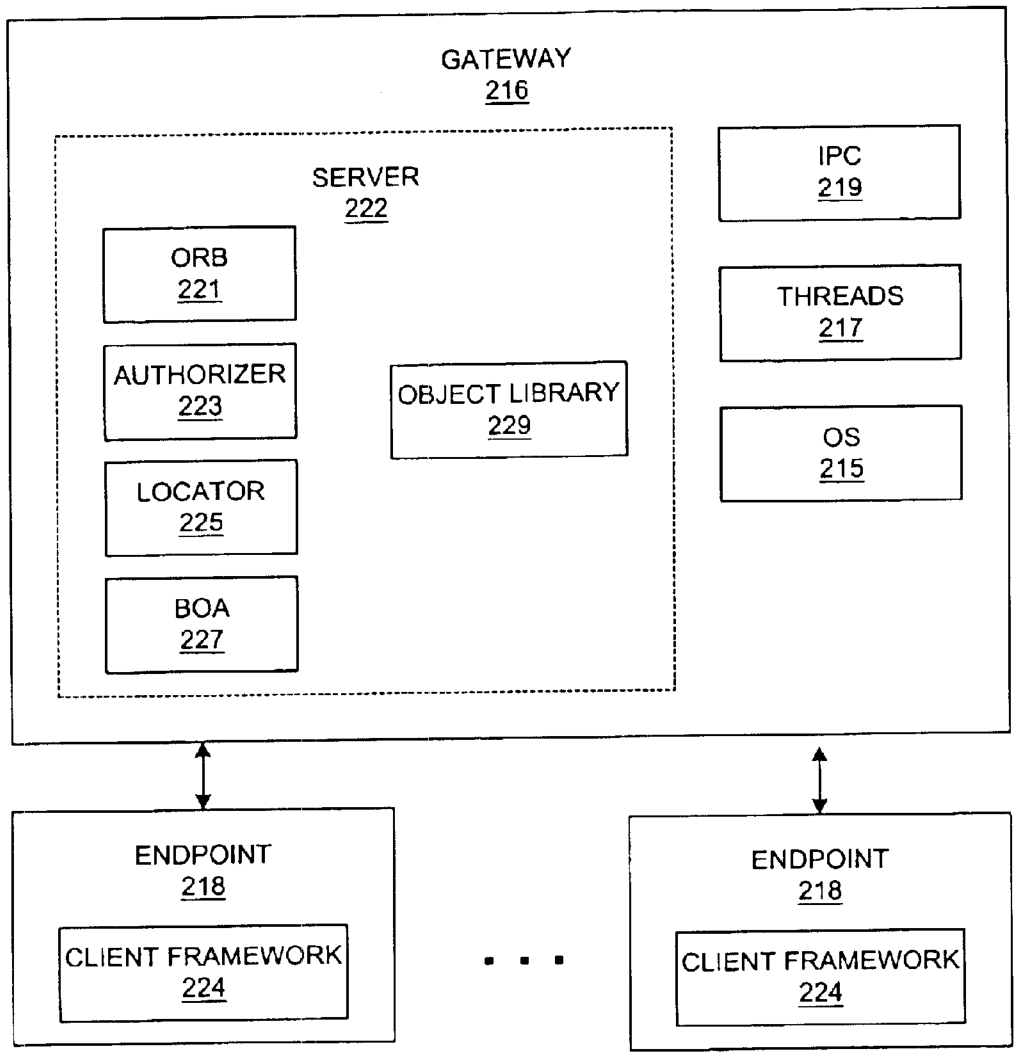
FIG. 2B is a block diagram of a preferred system management framework illustrating how the framework functionality is distributed across the gateway and its endpoints within a managed region.

With reference now to FIG. 2B, each gateway machine 216 runs a server component 222 of a system management framework. The server component 222 is a multi-threaded runtime process that comprises several components: an object request broker (ORB) 221, an authorization service 223, object location service 225 and basic object adapter (BOA) 227. Server component 222 also includes an object library 229. Preferably, ORB 221 runs continuously, separate from the operating system, and it communicates with both server and client processes through separate stubs and skeletons via an interprocess communication (IPC) facility 219. In particular, a secure remote procedure call (RPC) is used to invoke operations on remote objects. Gateway machine 216 also includes operating system 215 and thread mechanism 217.

The system management framework, also termed distributed kernel services (DKS), includes a client component 224 supported on each of the endpoint machines 218. The client component 224 is a low cost, low maintenance application suite that is preferably "dataless" in the sense that system management data is not cached or stored there in a persistent manner. Implementation of the management framework in this "client-server" manner has significant advantages over the prior art, and it facilitates the connectivity of personal computers into the managed environment. It should be noted, however, that an endpoint may also have an ORB for remote object-oriented operations within the distributed environment, as explained in more detail further below.

Using an object-oriented approach, the system management framework facilitates execution of system management tasks required to manage the resources in the managed region. Such tasks are quite varied and include, without limitation, file and data distribution, network usage monitoring, user management, printer or other resource configuration management, and the like. In a preferred implementation, the object-oriented framework includes a Java runtime environment for well-known advantages, such as platform independence and standardized interfaces. Both gateways and endpoints operate portions of the system management tasks through cooperation between the client and server portions of the distributed kernel services.

In a large enterprise, such as the system that is illustrated in FIG. 2A, there is preferably one server per managed region with some number of gateways. For a workgroup-size installation, e.g., a local area network, a single server-class machine may be used as both a server and a gateway. References herein to a distinct server and one or more gateway(s) should thus not be taken by way of limitation as these elements may be combined into a single platform. For intermediate size installations, the managed region grows breadth-wise, with additional gateways then being used to balance the load of the endpoints.

The server is the top-level authority over all gateway and endpoints. The server maintains an endpoint list, which keeps track of every endpoint in a managed region. This list preferably contains all information necessary to uniquely identify and manage endpoints including, without limitation, such information as name, location, and machine type. The server also maintains the mapping between endpoints and gateways, and this mapping is preferably dynamic.

As noted above, there are one or more gateways per managed region. Preferably, a gateway is a fully managed node that has been configured to operate as a gateway. In certain circumstances, though, a gateway may be regarded as an endpoint. A gateway always has a NIC, so a gateway is also always an endpoint. A gateway usually uses itself as the first seed during a discovery process. Initially, a gateway does not have any information about endpoints. As endpoints login, the gateway builds an endpoint list for its endpoints. The gateway's duties preferably include: listening for endpoint login requests, listening for endpoint update requests, and (its main task) acting as a gateway for method invocations on endpoints.

Figure 2C:
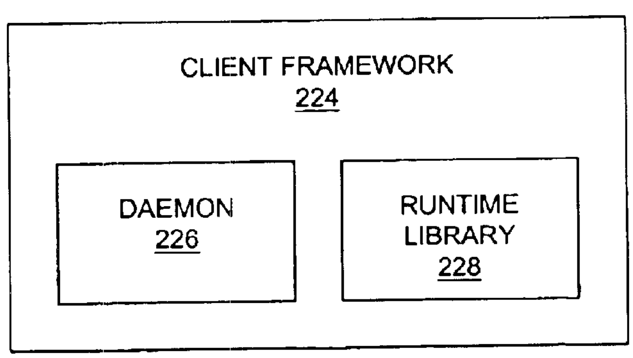
FIG. 2C is a block diagram of the elements that comprise the low cost framework (LCF) client component of the system management framework.

As also discussed above, the endpoint is a machine running the system management framework client component, which is referred to herein as a management agent. The management agent has two main parts as illustrated in FIG. 2C: daemon 226 and application runtime library 228. Daemon 226 is responsible for endpoint login and for spawning application endpoint executables. Once an executable is spawned, daemon 226 has no further interaction with it. Each executable is linked with application runtime library 228, which handles all further communication with the gateway.

Preferably, the server and each of the gateways is a distinct computer. For example, each computer may be a RISC System/6000™ (a reduced instruction set or so-called RISC-based workstation) running the AIX (Advanced Interactive Executive) operating system. Of course, other machines and/or operating systems may be used as well for the gateway and server machines.

Each endpoint is also a computing device. In one preferred embodiment of the invention, most of the endpoints are personal computers, e.g., desktop machines or laptops. In this architecture, the endpoints need not be high powered or complex machines or workstations. An endpoint computer preferably includes a Web browser such as Netscape Navigator or Microsoft Internet Explorer. An endpoint computer thus may be connected to a gateway via the Internet, an intranet or some other computer network.

Preferably, the client-class framework running on each endpoint is a low-maintenance, low-cost framework that is ready to do management tasks but consumes few machine resources because it is normally in an idle state. Each endpoint may be "dataless" in the sense that system management data is not stored therein before or after a particular system management task is implemented or carried out.

With reference now to FIG. 2D, a diagram depicts a logical configuration of software objects residing within a hardware network similar to that shown in FIG. 2A. The endpoints in FIG. 2D are similar to the endpoints shown in FIG. 2B. Object-oriented software, similar to the collection of objects shown in FIG. 1A, executes on the endpoints. Endpoints 230 and 231 support application objects 232–233, device driver objects 234–235, and operating system objects 236–237 that communicate across a network with other objects and hardware resources.

Resources can be grouped together by an enterprise into managed regions representing meaningful groups. Overlaid on these regions are domains that divide resources into groups of resources that are managed by gateways. The gateway machines provide access to the resources and also perform routine operations on the resources, such as polling. FIG. 2D shows that endpoints and objects can be grouped into managed regions that represent branch offices 238 and 239 of an enterprise, and certain resources are controlled by in central office 240. Neither a branch office nor a central office is necessarily restricted to a single physical location, but each represents some of the hardware resources of the distributed application framework, such as routers, system management servers, endpoints, gateways, and critical applications, such as corporate management Web servers. Different types of gateways can allow access to different types of resources, although a single gateway can serve as a portal to resources of different types.

With reference now to FIG. 2E, a diagram depicts the logical relationships between components within a system management framework that includes two endpoints and a gateway. FIG. 2E shows more detail of the relationship between components at an endpoint. Network 250 includes gateway 251 and endpoints 252 and 253, which contain similar components, as indicated by the similar reference numerals used in the figure. An endpoint may support a set of applications 254 that use services provided by the distributed kernel services 255, which may rely upon a set of platform-specific operating system resources 256. Operating system resources may include TCP/IP-type resources, SNMP-type resources, and other types of resources. For example, a subset of TCP/IP-type resources may be a line printer (LPR) resource that allows an endpoint to receive print jobs from other endpoints. Applications 254 may also provide self-defined sets of resources that are accessible to other endpoints. Network device drivers 257 send and receive data through NIC hardware 258 to support communication at the endpoint.

Figure 2F:
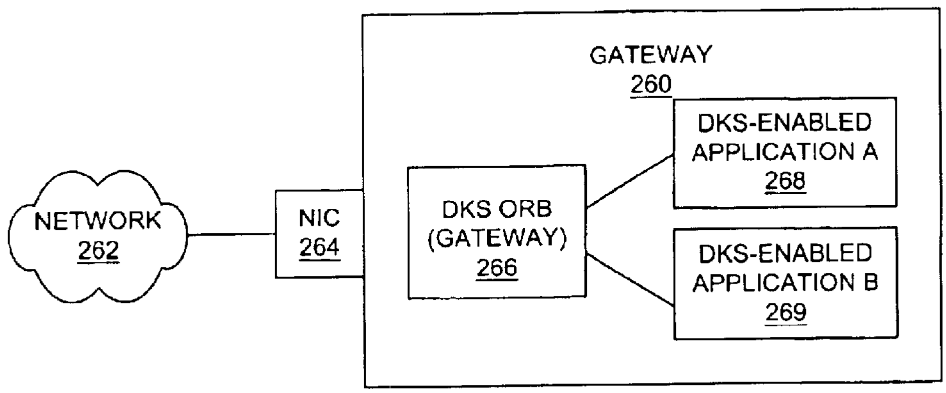
FIG. 2F is a diagram depicting the logical relationships between components within a system management framework that includes a gateway supporting two DKS-enabled applications.

With reference now to FIG. 2F, a diagram depicts the logical relationships between components within a system management framework that includes a gateway supporting two DKS-enabled applications. Gateway 260 communicates with network 262 through NIC 264. Gateway 260 contains ORB 266 that supports DKS-enabled applications 268 and 269. FIG. 2F shows that a gateway can also support applications. In other words, a gateway should not be viewed as merely being a management platform but may also execute other types of applications.

Figure 2G:
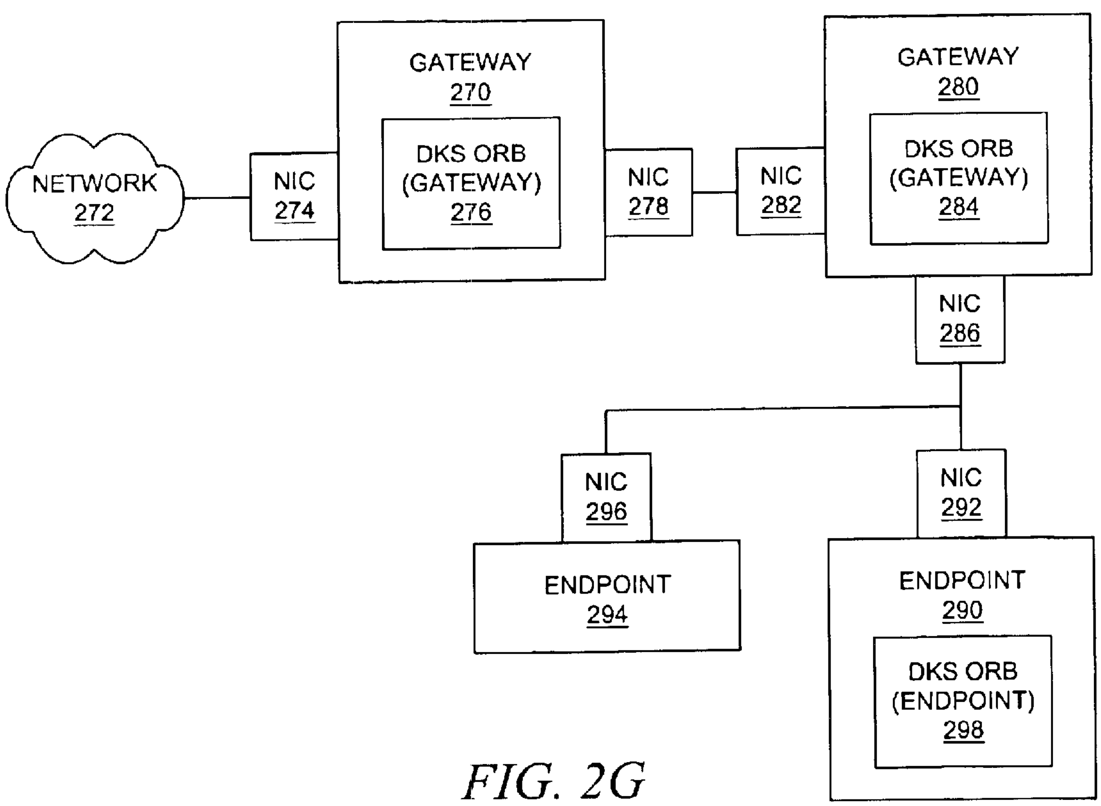
FIG. 2G is a diagram depicting the logical relationships between components within a system management framework that includes two gateways supporting two endpoints.

With reference now to FIG. 2G, a diagram depicts the logical relationships between components within a system management framework that includes two gateways supporting two endpoints. Gateway 270 communicates with network 272 through NIC 274. Gateway 270 contains ORB 276 that may provide a variety of services, as is explained in more detail further below. In this particular example, FIG. 2G shows that a gateway does not necessarily connect with individual endpoints.

Gateway 270 communicates through NIC 278 and network 279 with gateway 280 and its NIC 282. Gateway 280 contains ORB 284 for supporting a set of services. Gateway 280 communicates through NIC 286 and network 287 to endpoint 290 through its NIC 292 and to endpoint 294 through its NIC 296. Endpoint 290 contains ORB 298 while endpoint 294 does not contain an ORB. In this particular example, FIG. 2G also shows that an endpoint does not necessarily contain an ORB. Hence, any use of endpoint 294 as a resource is performed solely through management processes at gateway 280.

FIGS. 2F and 2G also depict the importance of gateways in determining routes/data paths within a highly distributed system for addressing resources within the system and for performing the actual routing of requests for resources. The importance of representing NICs as objects for an object-oriented routing system is described in more detail further below.

As noted previously, the present invention is directed to a methodology for managing leases on system resources within a distributed computing environment. A resource is a portion of a computer system's physical units, a portion of a computer system's logical units, or a portion of the computer system's functionality that is identifiable or addressable in some manner to other physical or logical units within the system.

In the present invention, consumers of resources can obtain leases on consumable resources such that the resources are made available in a timely yet equitable manner. Resources can be restricted during the lease period. For example, an application can obtain a lease for a certain amount of bandwidth for a requested period of time, and the lessee is notified when it must reduce its bandwidth. The preferred embodiment is described in more detail in the following description of the remaining figures.

Figure 3:
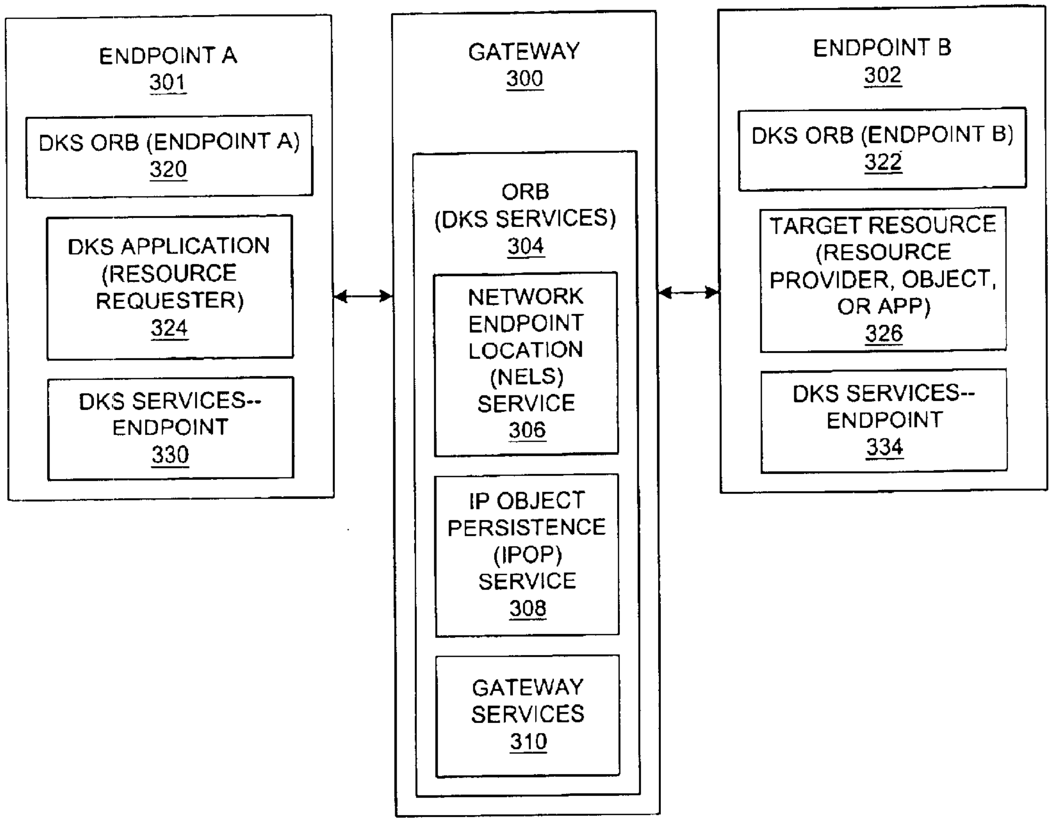
FIG. 3 is a block diagram depicting components within the system management framework that provide resource leasing management functionality within a distributed computing environment such as that shown in FIGS. 2D–2E.

With reference now to FIG. 3, a block diagram depicts components within the system management framework that provide resource leasing management functionality within a distributed computing environment such as that shown in FIGS. 2D–2E. A network contains gateway 300 and endpoints 301 and 302. Gateway 302 runs ORB 304. In general, an ORB can support different services that are configured and run in conjunction with an ORB. In this case, distributed kernel services (DKS) include Network Endpoint Location Service (NELS) 306, IP Object Persistence (IPOP) service 308, and Gateway Service 310. Lease management service 312 also operates within ORB 304. Alternatively, lease management service 312 can be permanently implemented as part of the Gateway Service.

The Gateway Service processes action objects, which are explained in more detail below, and directly communicates with endpoints or agents to perform management operations. The gateway receives events from resources and passes the events to interested parties within the distributed system. The NELS works in combination with action objects and determines which gateway to use to reach a particular resource. A gateway is determined by using the discovery service of the appropriate topology driver, and the gateway location may change due to load balancing or failure of primary gateways.

Other resource level services may include an SNMP (Simple Network Management Protocol) service that provides protocol stacks, polling service, and trap receiver and filtering functions. The SNMP Service can be used directly by certain components and applications when higher performance is required or the location independence provided by the gateways and action objects is not desired. A Metadata Service can also be provided to distribute information concerning the structure of SNMP agents.

The representation of resources within DKS allows for the dynamic management and use of those resources by applications. DKS does not impose any particular representation, but it does provide an object-oriented structure for applications to model resources. The use of object technology allows models to present a unified appearance to management applications and hide the differences among the underlying physical or logical resources. Logical and physical resources can be modeled as separate objects and related to each other using relationship attributes.

By using objects, for example, a system may implement an abstract concept of a router and then use this abstraction within a range of different router hardware. The common portions can be placed into an abstract router class while modeling the important differences in subclasses, including representing a complex system with multiple objects. With an abstracted and encapsulated function, the management applications do not have to handle many details for each managed resource. A router usually has many critical parts, including a routing subsystem, memory buffers, control components, interfaces, and multiple layers of communication protocols. Using multiple objects has the burden of creating multiple object identifiers (OIDs) because each object instance has its own OID. However, a first order object can represent the entire resource and contain references to all of the constituent parts.

Each endpoint may support an object request broker, such as ORBs 320 and 322, for assisting in remote object-oriented operations within the DKS environment. Endpoint 301 contains DKS-enabled application 324 that requests leases for utilizing object-oriented resources found within the distributed computing environment. Endpoint 302 contains target resource provider object or application 326 that services the requests from DKS-enabled application 324. The lease requests are initiated through lease management client 328. Lease management service 312 at the gateway eventually receives and manages the lease requests. A set of DKS services 330 and 334 support each particular endpoint.

Applications require some type of insulation from the specifics of the operations of gateways. In the DKS environment, applications create action objects that encapsulate command which are sent to gateways, and the applications wait for the return of the action object. Action objects contain all of the information necessary to run a command on a resource. The application does not need to know the specific protocol that is used to communicate with the resource. The application is unaware of the location of the resource because it issues an action object into the system, and the action object itself locates and moves to the correct gateway. The location independence allows the NELS to balance the load between gateways independently of the applications and also allows the gateways to handle resources or endpoints that move or need to be serviced by another gateway.

The communication between a gateway and an action object is asynchronous, and the action objects provide error handling and recovery. If one gateway goes down or becomes overloaded, another gateway is located for executing the action object, and communication is established again with the application from the new gateway. Once the controlling gateway of the selected endpoint has been identified, the action object will transport itself there for further processing of the command or data contained in the action object. If it is within the same ORB, it is a direct transport. If it is within another ORB, then the transport can be accomplished with a "Moveto" command or as a parameter on a method call.

Queuing the action object on the gateway results in a controlled process for the sending and receiving of data from the IP devices. As a general rule, the queued action objects are executed in the order that they arrive at the gateway. The action object may create child action objects if the collection of endpoints contains more than a single ORB ID or gateway ID. The parent action object is responsible for coordinating the completion status of any of its children. The creation of child action objects is transparent to the calling application. A gateway processes incoming action objects, assigns a priority, and performs additional security challenges to prevent rogue action object attacks. The action object is delivered to the gateway that must convert the information in the action object to a form suitable for the agent. The gateway manages multiple concurrent action objects targeted at one or more agents, returning the results of the operation to the calling managed object as appropriate.

In the preferred embodiment, potentially leasable target resources are Internet protocol (IP) commands, e.g. pings, and Simple Network Management Protocol (SNMP) commands that can be executed against endpoints in a managed region. Referring again to FIGS. 2F and 2G, each NIC at a gateway or an endpoint may be used to address an action object. Each NIC is represented as an object within the IPOP database, which is described in more detail further below.

The Action Object IP (AOIP) Class is a subclass of the Action Object Class. AOIP objects are the primary vehicle that establishes a connection between an application and a designated IP endpoint using a gateway or stand-alone service. In addition, the Action Object SNMP (AOSnmp) Class is also a subclass of the Action Object Class. AOSnmp objects are the primary vehicle that establishes a connection between an application and a designated SNMP endpoint via a gateway or the Gateway Service. However, the present invention is primarily concerned with IP endpoints.

The AOIP class should include the following: a constructor to initialize itself; an interface to the NELS; a mechanism by which the action object can use the ORB to transport itself to the selected gateway; a mechanism by which to communicate with the SNMP stack in a stand-alone mode; a security check verification of access rights to endpoints; a container for either data or commands to be executed at the gateway; a mechanism by which to pass commands or classes to the appropriate gateway or endpoint for completion; and public methods to facilitate the communication between objects.

The instantiation of an AOIP object creates a logical circuit between an application and the targeted gateway or endpoint. This circuit is persistent until command completion through normal operation or until an exception is thrown. When created, the AOIP object instantiates itself as an object and initializes any internal variables required. An AOIP object may be capable of running a command from inception or waiting for a future command. A program that creates an AOIP object must supply the following elements: address of endpoints; function to be performed on the endpoint, class, or object; and data arguments specific to the command to be run. A small part of the action object must contain the return end path for the object. This may identify how to communicate with the action object in case of a breakdown in normal network communications. An action object can contain either a class or object containing program information or data to be delivered eventually to an endpoint or a set of commands to be performed at the appropriate gateway. AOIP object return a result for each address endpoint targeted.

Using commands such as "Ping", "Trace Route", "Wake-On LAN", and "Discovery", the AOIP object performs the following services: facilitates the accumulation of metrics for the user connections; assists in the description of the topology of a connection; performs Wake-On LAN tasks using helper functions; and discovers active agents in the network environment.

The NELS service finds a route (data path) to communicate between the application and the appropriate endpoint. The NELS service converts input to protocol, network address, and gateway location for use by action objects. The NELS service is a thin service that supplies information discovered by the IPOP service. The primary roles of the NELS service are as follows: support the requests of applications for routes; maintain the gateway and endpoint caches that keep the route information; ensure the security of the requests; and perform the requests as efficiently as possible to enhance performance.

For example, an application requires a target endpoint (target resource) to be located. The target is ultimately known within the DKS space using traditional network values, i.e. a specific network address and a specific protocol identifier. An action object is generated on behalf of an application to resolve the network location of an endpoint. The action object asks the NELS service to resolve the network address and define the route to the endpoint in that network.

One of the following is passed to the action object to specify a destination endpoint: an EndpointAddress object; a fully decoded NetworkAddress object; and a string representing the IP address of the IP endpoint. In combination with the action objects, the NELS service determines which gateway to use to reach a particular resource. The appropriate gateway is determined using the discovery service of the appropriate topology driver and may change due to load balancing or failure of primary gateways. An "EndpointAddress" object must consist of a collection of at least one or more unique managed resource IDs. A managed resource ID decouples the protocol selection process from the application and allows the NELS service to have the flexibility to decide the best protocol to reach an endpoint. On return from the NELS service, an "AddressEndpoint" object is returned, which contains enough information to target the best place to communicate with the selected IP endpoints. It should be noted that the address may include protocol-dependent addresses as well as protocol-independent addresses, such as the virtual private network id and the IPOP Object ID. These additional addresses handle the case where duplicate addresses exist in the managed region.

When an action needs to be taken on a set of endpoints, the NELS service determines which endpoints are managed by which gateways. When the appropriate gateway is identified, a single copy of the action object is distributed to each identified gateway. The results from the endpoints are asynchronously merged back to the caller application through the appropriate gateways. Performing the actions asynchronously allows for tracking all results whether the endpoints are connected or disconnected. If the action object IP fails to execute an action object on the target gateway, NELS is consulted to identify an alternative path for the command. If an alternate path is found, the action object IP is transported to that gateway and executed. It may be assumed that the entire set of commands within one action object IP must fail before this recovery procedure is invoked.

Figure 4:
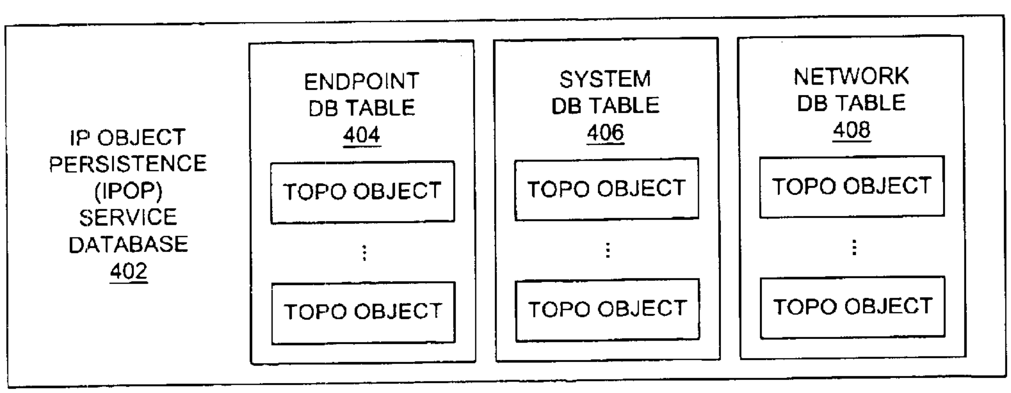
FIG. 4 is a block diagram showing data stored by a the IPOP (IP Object Persistence) service.

With reference now to FIG. 4, a block diagram shows the manner in which data is stored by the IPOP (IP Object Persistence) service. IPOP service database 402 contains endpoint database table 404, system database table 406, and network database table 408. Each table contains a set of topological (topo) objects for facilitating the leasing of resources at IP endpoints and the execution of action objects. Information within IPOP service database 402 allows applications to generate action objects for resources previously identified as IP objects through a discovery process across the distributed computing environment. FIG. 4 merely shows that the topo objects may be separated into a variety of categories that facilitate processing on the various objects. The separation of physical network categories facilitates the efficient querying and storage of these objects while maintaining the physical network relationships in order to produce a graphical user interface of the network topology.

Figures 5, 7B:
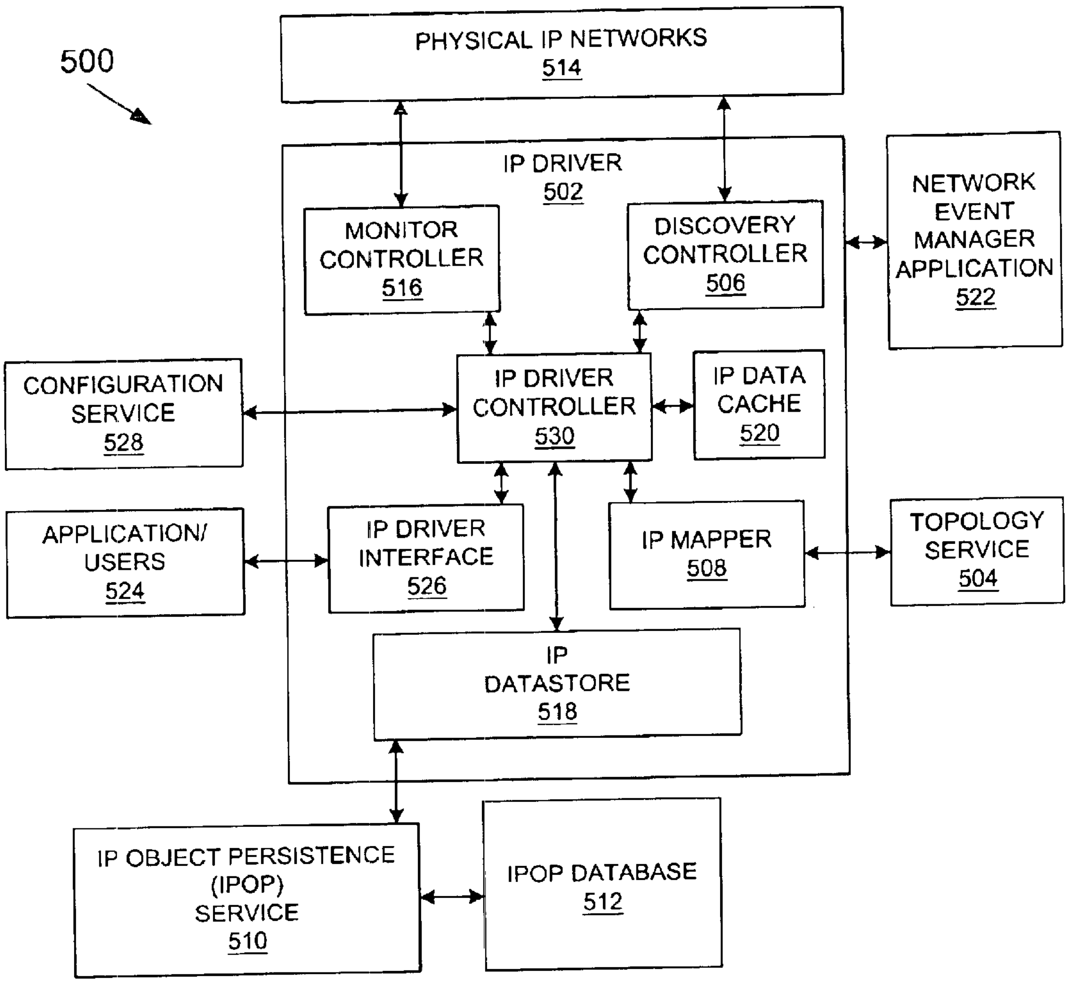

With reference now to FIG. 5, a block diagram shows the IPOP service in more detail. In the preferred embodiment of the present invention, an IP driver subsystem is implemented as a collection of software components for using physical network connections to discover (detect) IP "objects", which are IP networks, IP systems, and IP endpoints. This discovered physical network is used to create topology data that is then provided through other services via topology maps accessible through a graphical user interface (GUI) or for the manipulation of other applications. The IP driver system can also monitor objects for changes in IP topology and update databases with the new topology information. The IPOP service provides services for other applications to access the IP object database.

IP driver subsystem 500 contains a conglomeration of components, including one or more IP drivers 502. Every IP driver manages its own scope, and every IP driver is assigned to a topology manager within topology service 504, which can serve may than one IP driver. Topology service 504 stores topology information obtained from discovery controller 506. The information stored within the topology service may include graphs, arcs, and the relationships between nodes determined by IP mapper 508. Users can be provided with a GUI to navigate the topology, which can be stored within a topology service database.

IPOP service 510 provides a persistent repository 512 for discovered IP objects; persistent repository 512 contains attributes of IP objects without presentation information. Discovery controller 506 detects IP objects in Physical IP networks 514, and monitor controller 516 monitors IP objects. A persistent repository, such as IPOP database 512, is updated to contain information about the discovered and monitored IP objects. IP driver may use temporary IP data store component 518 and IP data cache component 520 as necessary for caching IP objects or storing IP objects in persistent repository 512, respectively. As discovery controller 506 and monitor controller 516 perform detection and monitoring functions, events can be written to network event manager application 522 to alert network administrators of certain occurrences within the network, such as the discovery of duplicate IP addresses or invalid network masks.

External applications/users 524 can be other users, such as network administrators at management consoles, or applications that use IP driver GUI interface 526 to configure IP driver 502, manage/unmanage IP objects, and manipulate objects in persistent repository 512. Configuration service 528 provides configuration information to IP driver 502. IP driver controller 532 serves as central control of all other IP driver components. One or more IP drivers can be deployed to provide distribution of IP discovery and promote scalability of IP driver subsystem services in large networks where a single IP driver subsystem is not sufficient to discover and monitor all IP objects. Each IP discovery driver performs discovery and monitoring on a collection of IP resources within the driver's "scope". A driver's scope is simply the set of IP subnets for which the driver is responsible for discovering and monitoring. Network administrators generally partition their networks into as many scopes as needed to provide distributed discovery and satisfactory performance.

Referring back to FIG. 2G, a network discovery engine is a distributed collection of IP drivers that are used to ensure that operations on IP objects by gateways 260, 270, and 280 can scale to a large installation and provide fault-tolerant operation with dynamic start/stop or reconfiguration of each IP driver. The IPOP Service manages discovered IP objects; to do so, the IPOP Service uses a distributed database in order to efficiently service query requests by a gateway to determine routing, identity, or a variety of details about an endpoint. The IPOP Service also services queries by the Topology Service in order to pictorial display a physical network or map them to a logical network, which is a subset of a physical network that is defined programmatically or by an administrator. IPOP fault tolerance is also achieved by distribution of IPOP data and the IPOP Service among many Endpoint ORBs.

With reference now to FIGS. 6A–6B, flowcharts show processes for configuring and initializing for lease management of resources within a distributed computing environment such as that shown in FIGS. 2D–2E. After the topology of the IP objects and the IP endpoints within the distributed computing environment of devices supporting the DKS framework has been determined, applications can proceed to request leases of those resources. The dynamic monitoring of the networks and resources may change the IP topology, yet the leases can be modified on-the-fly during the lease period.

The process begins when potentially leasable resources are identified and configured (step 604), which is shown in more detail in FIG. 6B. It should be noted that the steps in FIG. 6A depict a variety of automatic, semi-automated, and manual processes for installing and configuring a system within the DKS environment. The JVMs are configured to include the DKS functionality and installed/distributed across the DKS environment (step 606). The applications and user requirements, such as user accounts, authorizations, etc., are then configured for operation within the DKS environment (step 608). After the various components are installed, the system is initialized for actual processing of action objects (step 610). The initialization can consist of starting the execution of the DKS environment and the JVMs at endpoints that have ORBs. Once the ORBs are initialized and their services are started, remote method calls can occur between endpoints in the managed region. The process for initializing the distributed computing environment is then complete.

Referring now to FIG. 6B, the flowchart shows a process for configuring leasable resources in more detail. For example, the initial topology may be discovered during an initialization period so that IPOP databases can be populated (step 652). Object IDs (OIDs) are then assigned to each endpoint in the IPOP database (step 654), which allows one object to be addressed by another object. For example, referring again to FIG. 2G, each NIC is instantiated as an IP object within the IPOP database during the discovery process. The IPOP Service then creates action object routes in the IPOP database (step 656) using the Gateway Service configuration, and these routes are made available for applications and services requiring route information. This may be performed by an IP mapper component determining efficient routes through the network for various types of resources requested by certain regions within the network.

In conjunction with a configuration service within the distributed kernel system, a system or network administrator may predetermine certain criteria to be applied to the resources that impinge on the availability of the particular resources for certain users during certain schedules. These parameters, such as lease period limitations, user restrictions, resource limitations, etc., are then stored in the IPOP database (step 658).

Figures 7A, 7D:
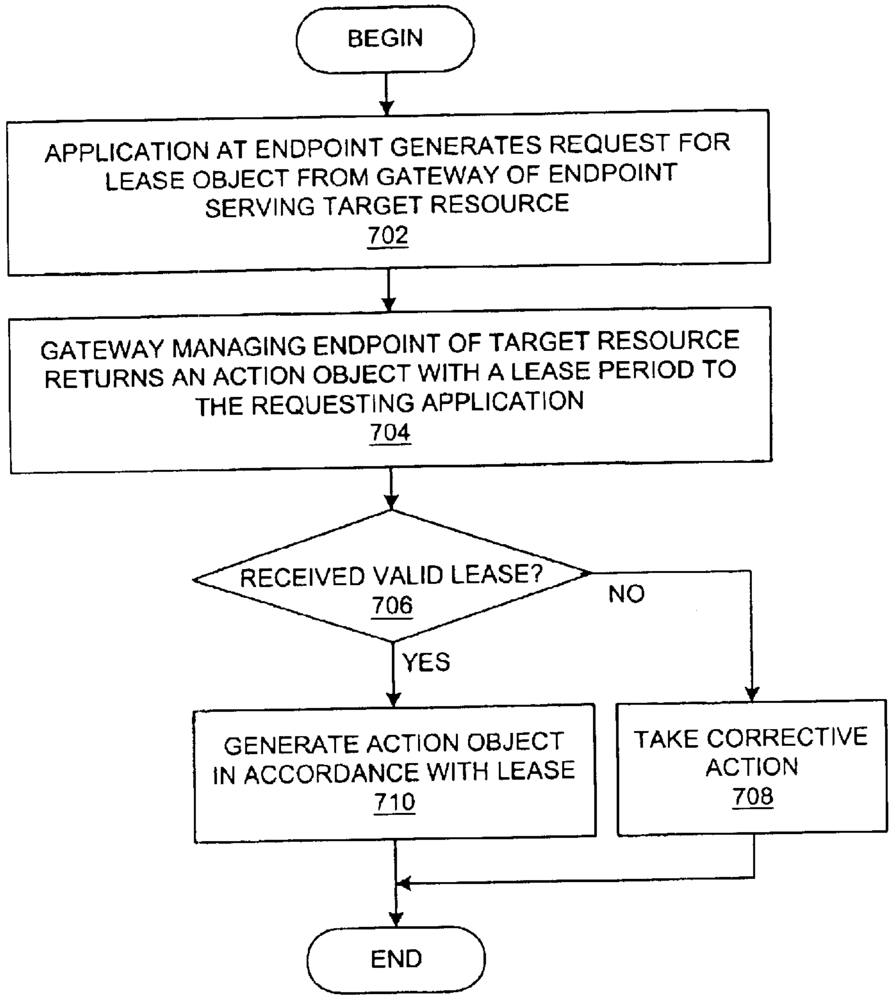

With reference now to FIG. 7A, a flowchart shows a process for requesting and obtaining resource leases. The processes shown in FIG. 7A, FIG. 7F, and FIG. 7G occur after the configuration and initialization processes, as shown in FIGS. 6A–6B, have been completed.

Referring to FIG. 7A, an application executing on an endpoint generates a request for a lease object from the gateway responsible for the endpoint serving the target resource (step 702). The request for the lease object contains a desired lease time period or lease length. A lease object is a type of action object, as explained in more detail with respect to FIG. 7B further below.

The gateway managing the endpoint of interest returns an action object with a lease period to the requesting application (step 704). The lease time is included in the action object prepared for the requesting application executing on behalf of a user.

The lease length may not be identical to the requested lease period. As noted above, the lease periods for a particular resource may be configured in a variety of manners. For example, the lease lengths for a particular user may be restricted for all resources of a particular type, or the user may be restricted to leasing a particular resource for a predetermined amount of time. As another example, a lease request to a target resource from a particular endpoint may be restricted based for a variety of reasons, such as network topology, network bandwidth, etc.

A determination is made as to whether or not a valid lease object is received in response to the lease request (step 706), i.e. whether or not a lease grant (granted lease) has been received. Infinite lease periods are valid and may be denoted by a negative number. Depending upon the type of resource, a zero lease period may also be valid. If a valid lease has not been received, then the appropriate corrective action can be performed (step 708). For example, the application may decide to request an alternative resource to accomplish a task. For example, if the original request was for outputting a print job to a specific printer via an LPR Action Object and the lease was denied, then the application might then send the print job with parameters that specify the print job to be printed on any printer within a specific workgroup on a certain subnet.

If the application receives a valid lease in response to its request, then the application can issue one or more action objects that utilize the requested resource in accordance with the lease (step 710). The process of obtaining a lease is then complete.

Figures 7E, 7F:
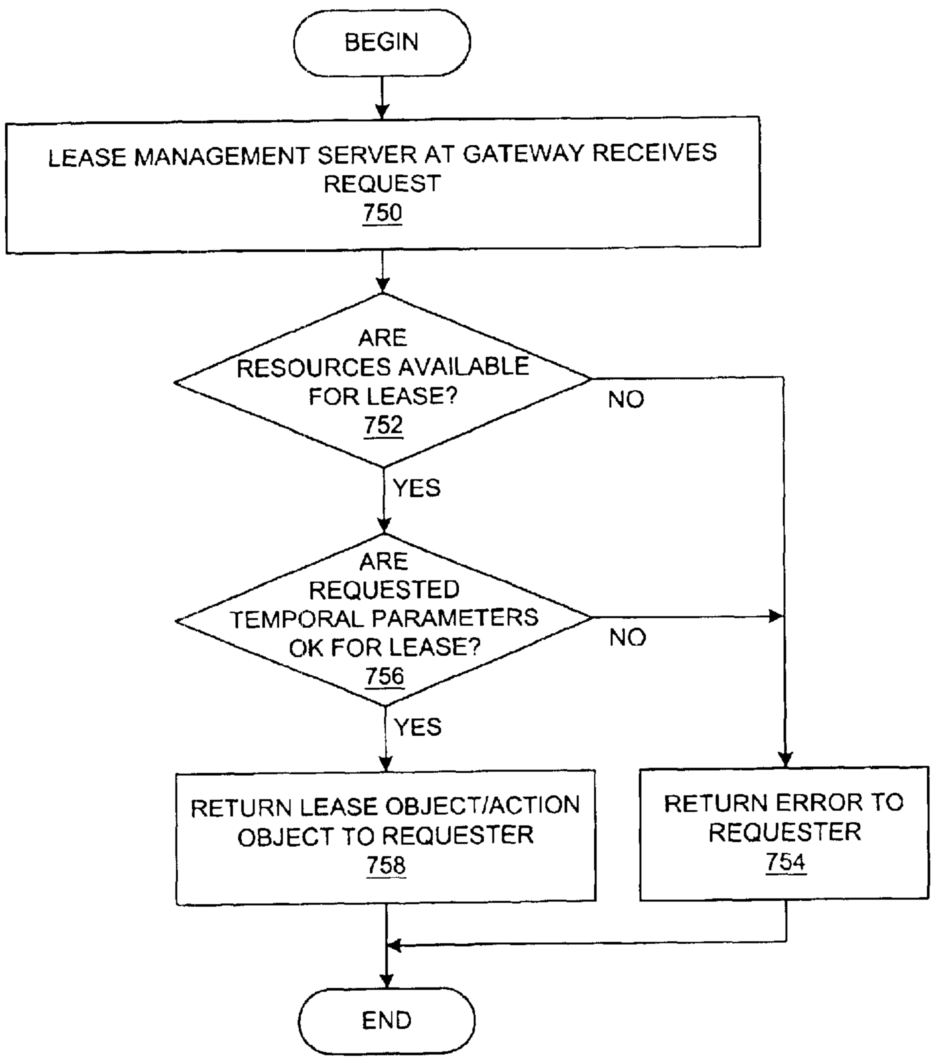

With reference now to FIGS. 7B–7E, some simplified pseudo-code depicts the manner in which action objects and lease action objects can be implemented in an object-oriented manner. FIG. 7B shows a class for action objects, while FIG. 7C shows a class for lease action objects that extend the class for action objects. FIG. 7D shows that one of the exceptions that may be thrown during a request for a lease action object may be caused by the requested lease time being unacceptable. FIG. 7E shows some pseudo-code for instantiating a lease action object and then invoking a method within the lease action object class.

With reference now to FIG. 7F, a flowchart depicts a more detailed process of the manner in which a lease is provided to a requester. The process begins when the lease management server at a gateway receives a request for a particular resource (step 750). The lease management server is responsible for enforcement of leases periods so that the requesting applications are forced to adhere to the leases. The server determines whether or not the requested resource or resources are available for leasing (step 752), which is determined in the manner shown in more detail in FIG. 7G. If the resources are not available, then an error of some type is returned to the requester (step 754), and the process within the server is complete. If the lease can be accommodated, then a lease object is returned to the requester after appropriately recording the lease parameters within the IPOP database (step 758), and the process within the server for providing a lease is then complete.

Figure 7G:
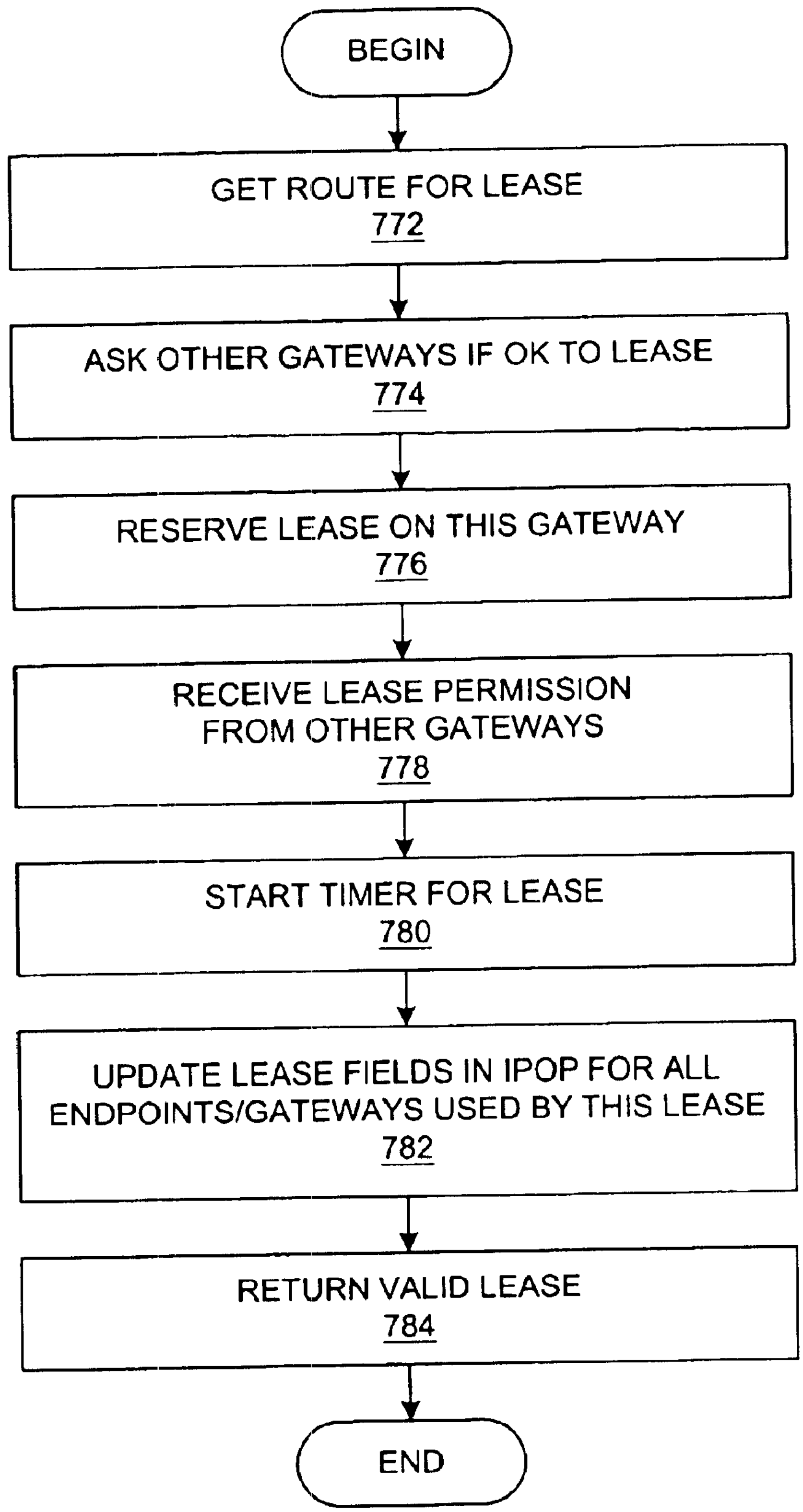
FIG. 7G is a flowchart depicting a process for determining whether or not the requested resource or resources are available for leasing.

With reference now to FIG. 7G, a flowchart shows a process for determining whether or not the requested resource or resources are available for leasing. After a lease request has been received, the lease management server determines a route for the completion of the action object that represents the leasing of the target resource (step 772). The route represents a logical circuit that is required to complete the action object, as described above.

Once the route is determined, then the lease management server sends requests to other gateways (step 774) that are along the determined route for permission to lease resources along the route that are under the control of those gateways yet required to ensure the completion of the requested lease. In other words, a determination is most likely made by the other gateways as to whether or not the requested lease period conflicts with the time periods of other leases that have been accepted by the other gateways. The lease is then recorded on the gateway of the lease management server (step 776), and the lease management server ensures that lease permissions are received by other gateways (step 778). If a problem is found while attempting to obtain leases from other gateways, then the lease management server can identify an alternative route and obtain leases from gateways along the alternative route.

The lease management server then starts a timer for the lease currently being generated (step 780), and the appropriate lease fields within the IPOP database are then updated for all endpoints and gateways used by this particular lease (step 782). The lease management server is then returned to the requester (step 784), and the process is complete.

Figure 7H:
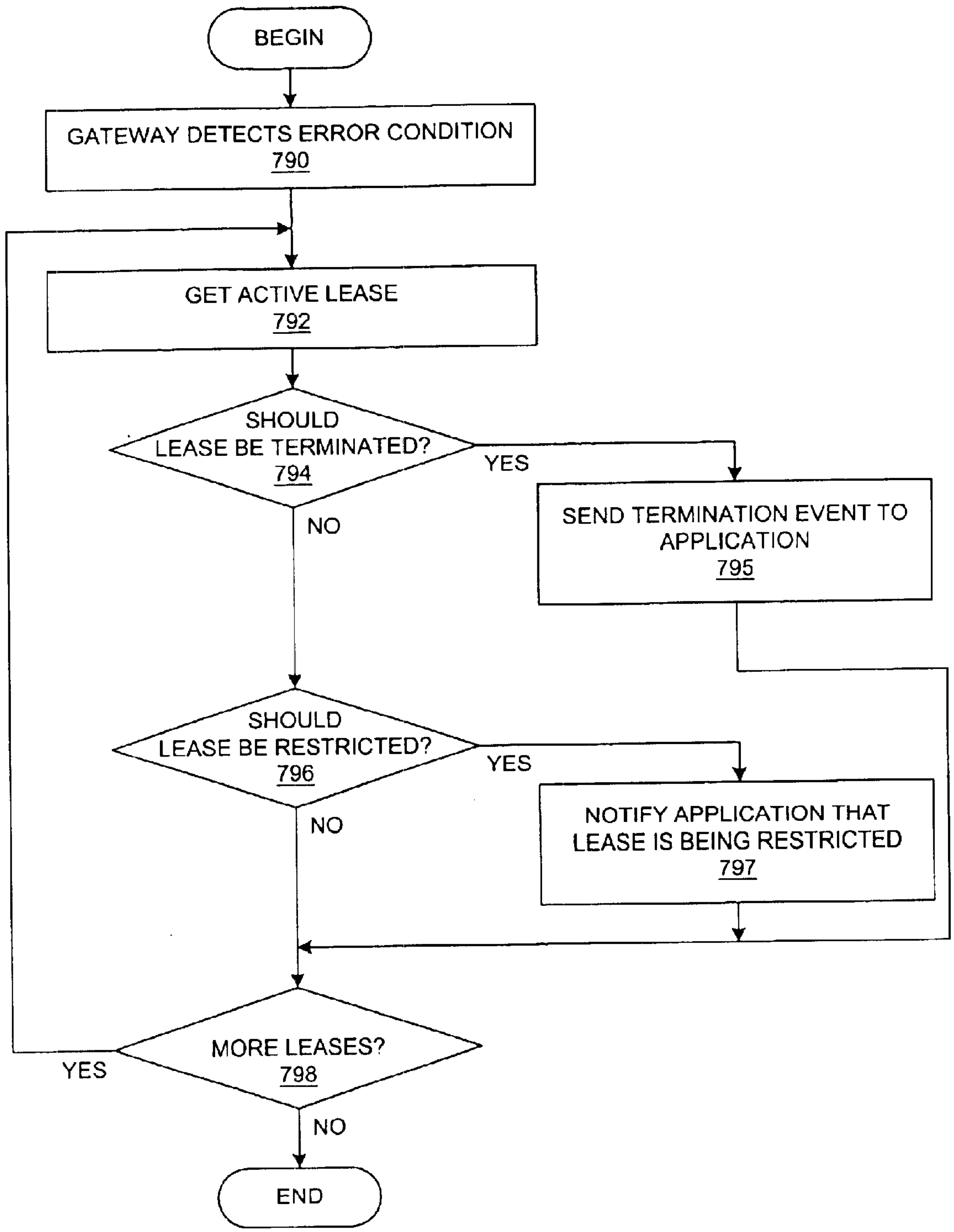
FIG. 7H is a flowchart depicting a process for restricting a lease in the event of an error condition.

With reference now to FIG. 7H, a flowchart shows a process for restricting a lease in the event of an error condition. Terminating or restricting a lease may be necessary when an error condition is detected at the gateway. Depending on the detected error condition, the situation may be partially ameliorated by not issuing new leases. In certain cases, new leases may be issued with short lease lengths, thereby causing the requester to issue additional lease requests; for each request, a check can be made prior to issuing a new lease. It should be noted that the lease might be restricted because the error condition occurred at the target resource or because the error otherwise prevents the lease from being completed. For example, the error may impair the route that has been reserved for the route.

The process begins by detecting an error condition at a gateway (step 790). Assuming that there is at least one active lease, the gateway then retrieves information about an active lease (step 792). The gateway then determines whether or not the lease should be terminated based on the error condition (step 794). If so, then the application is notified that the lease is being terminated (step 795). Terminating a lease is accomplished with object-oriented event listeners at the application listening for termination events sent by the lease management server. If the lease is not being terminated, then the gateway determines whether or not the lease should be restricted (step 796). If so, then the application is notified that the lease is being restricted (step 797). The gateway then determines whether there are any other leases to be checked, and if so, the process loops back to step 792 to process another lease. Otherwise, the process of restricting the lease is complete.

Figure 8:
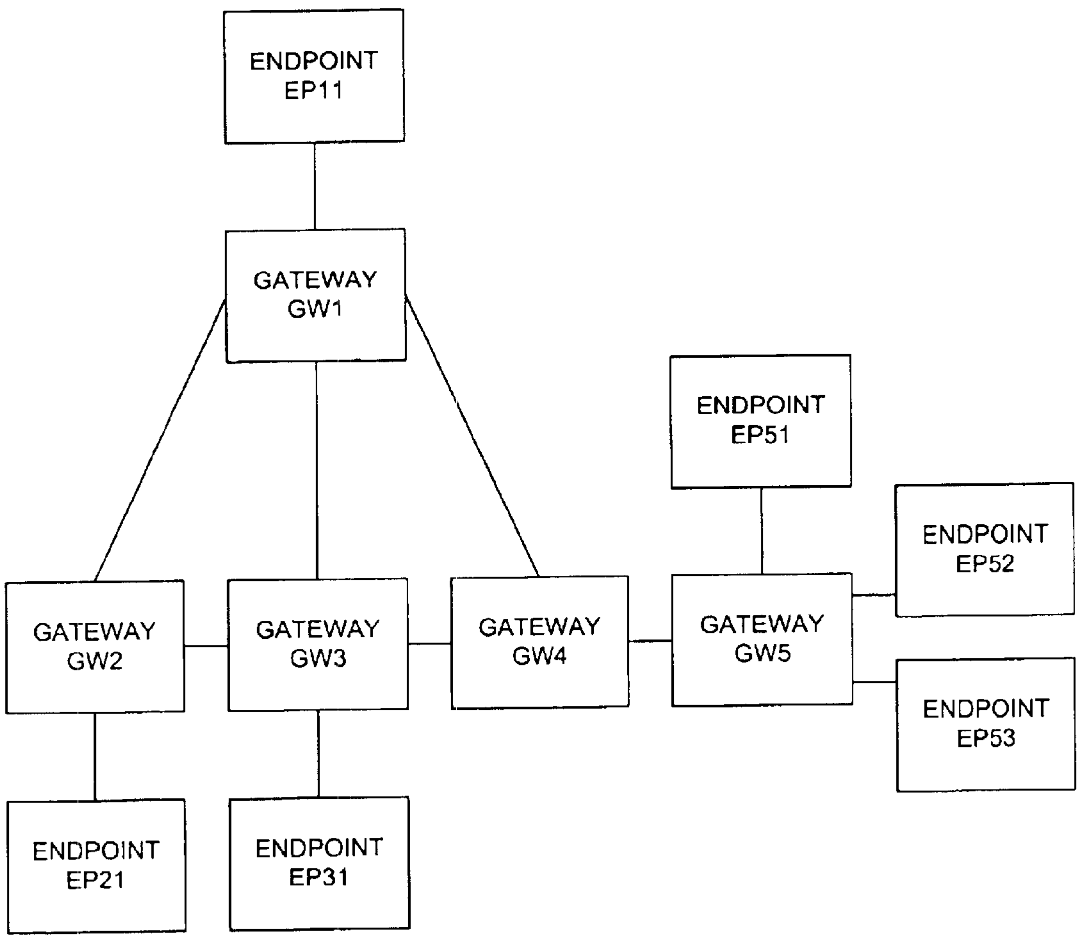
FIG. 8 is a block diagram representing a distributed data processing system consisting of gateways and endpoints on which resource leasing may be implemented.

With reference now to FIG. 8, a block diagram depicts a distributed data processing system consisting of gateways and endpoints on which resource leasing may be implemented. In a typical, highly distributed system, the workload across the entire system may be fairly predictable, but workloads change in a very dynamic manner, and network bandwidth and network traffic can change unpredictable. In other aspects, various resources throughout the distributed system can fail or become oversubscribed, thereby impacting the availability of another resource.

The present invention is directed to leasing resources within a distributed data processing system such that the system management architecture can support apportioning resources from a shared backbone of equipment and services. By providing this type of granularity, a robust management system can enable a service provider to enter into quality-of-service agreements with its customers.

More particularly, the present invention allows an application, or some type of consumer of resources, to request leases of resources. The resource management system can manage leases of resources in a dynamic and flexible manner such that when failures or error conditions are detected, the lease management system can manipulate active leases in an optimal manner to maintain some of the active leases. Similarly, if a heavy load is detected on one or more resources, the lease management system can manipulate active leases in an optimal manner to adjust the loads.

FIG. 8 shows five gateways GW1–GW5 connected in the following way: gateway GW1 is connected to gateways GW2, GW3, and GW4; gateway GW2 is connected to gateways GW1 and GW3; gateway GW3 is connected to gateways GW1, GW2, and GW4; gateway GW4 is connected to gateways GW1, GW3, and GW5; and gateway GW5 is connected to gateway GW4. A few of the gateways are connected to endpoints: gateway GW1 has endpoint EP11; gateway GW2 has endpoint EP21; gateway GW3 has endpoint EP31; and gateway GW5 has endpoints EP51, EP52, and EP53.

In a first example that depicts an oversubscribed condition, endpoint EP11 can request a lease for a resource at endpoint EP51. In order to grant the lease, gateway GW5 ensures the availability of other resources that are required to complete the requested lease. Gateway GW5 checks the IPOP database for the network route that will be required to complete the requested lease, and it would be found that the route passes through GW4, thereby requiring GW5 to check with GW4 to request a lease of any resources that might be consumed by the original requested lease at gateway GW4.

Assuming that data is passed back and forth between endpoint EP51 and endpoint EP11 during the lease period, then the data traffic for the original lease will consume a certain amount of bandwidth on the communication link between gateways GW4 and GW5. The communication link consists of one or more resources with limited capacity, such as the bandwidth capacity of each NIC at the ends of the link between GW4 and GW5, and gateway GW4 must determine that enough bandwidth is available for the new lease requirements prior to approving the lease request from GW5. In response to a positive determination, GW4 would record the lease for the consumed resources.

Depending on the system implementation, network bandwidth itself may be a leasable resource. It should also be noted that other types of resources may be required when reserving bandwidth, such as memory buffers within routers, etc. In this manner, an application can obtain a lease for a certain amount of bandwidth and notified when it must reduce its bandwidth.

Assuming that gateway GW4 approves the requested lease from gateway GW5, then gateway GW5 can record and grant the originally requested lease, and a valid lease is returned to endpoint EP11.

Similarly, endpoint EP21 can then request a lease for a resource at endpoint EP52. In order to grant the lease, gateway GW5 checks with GW4 to request a lease of any resources that might be consumed at gateway GW4. Assuming that gateway GW4 approves the requested lease from gateway GW5, a lease can then be granted by gateway GW5 to endpoint EP21.

At some point in time during the period of these leases, endpoint EP31 can request a lease for a resource at endpoint EP53. Assuming that data is passed back and forth between endpoint EP31 and endpoint EP53 during the lease period, then the data traffic for the newly requested lease will consume a certain amount of bandwidth on the communication link between gateways GW4 and GW5. When gateway GW5 attempts to reserve resources at GW4 for the newly requested lease, gateway GW4 may deny the lease. However, the lease management servers within all of the gateways may have load balancing algorithms, optimal solution functions, fairness schemes, etc., which determine that the newly requested lease should not be rejected. Instead, gateway GW5 may trim the active leases in an appropriate manner. For example, gateway GW5 may reject the next renewal request of the first activated lease while also reducing the lease period of the second activated lease. In certain scenarios, an active lease may be terminated to ensure that the newly requested lease may be granted. In other cases, the newly requested lease may be rejected outright, thereby causing endpoint EP31 to submit another subsequent request, possibly with different request parameters.

The present invention allows a significant load to be detected prior to one or more applications consuming all of the bandwidth, memory, persistent storage, etc., at an endpoint, which would cause various types of well-known error conditions. Prior to the resource being exhausted or overloaded, a next request for the resource can be used to detect increased demand on a resource, and the active leases can be adjusted to accommodate the newly requested lease as necessary. This is particular useful with a network that carries a significant amount of streaming audio and/or video data that requires the bandwidth to be managed in some manner.

In a second example that depicts an error condition, assume that the three leases described immediately above have been granted but that gateway GW4 detects an error condition of some type. Gateway GW4 can notify gateway GW5 that the leases requested by gateway GW5 are being curtailed in some manner, after which gateway GW5 can examine its granted leases to determine which active leases should be modified, adjusted, or terminated, which may require gateway GW5 to notify one of the requesting endpoints. In other cases, gateway GW5 may not need to notify an endpoint and may be able to ensure the successful completion of the action object associated with the lease.

In this manner, the chain of leases can be viewed as forming a distributed lease; resources that depend upon other resources have leases that also depend upon other leases. In addition, the resource itself does not attempt to manage its capacity in consideration of the capacity of other resources.

The advantages of the present invention should be apparent in view of the detailed description of the invention that is provided above. A distributed data processing system can be managed using a gateway-endpoint organization that allows for a highly distributed service management architecture. Services within this framework enable resource consumers to address resources and use resources throughout the distributed system.

The framework is preferably implemented in an object-oriented manner. Resources are represented as objects. A request for a target resource is instantiated as an action object that is both protocol-independent and network-route-unaware. The action object is addressed to the target resource, and the distributed framework routes the action object through the system so that the appropriate gateway receives the action object and ensures its completion and the return of status from its execution, whether or not the action object completes successfully. The distributed nature of the gateways and their services allow logical routes to be dynamically determined for the action objects. As hardware and/or software failures occur, the action objects can be rerouted, thereby providing fault-tolerance within the system.

When a request for a resource is initiated, the management system ensures the availability of all of the resources along the logical route that are required for the successful completion of the target resource. In a highly distributed system, the distribution of the workload within the system may change constantly. If the system workload shifts in a manner that affects the successful completion of an action object, the manner in which active action objects are completed can be altered in order to redistribute the workload and to attempt to complete the active action objects successfully.

With the lease management system provided by the present invention, the consumer of a resource can inform the system of the desire to lease a target resource for a particular period of time at a particular level of service. As the workload within the system changes or as hardware and/or software fails within the system, the resource consumer can be notified that the terms of the lease are being altered. In this manner, the resource consumer is provided with at least a minimal amount of notification that the desired usage of the resource is being changed.

With the present invention, the distributed framework allows the system to have the flexibility to manage the leases rather than directly managing the target resources. In most prior art systems, the distributed system might provide point-to-point or one-to-one access to a target resource, e.g., through a first-come, first-serve mechanism, a round-robin mechanism, or some type of priority scheme. In contrast, having the ability to achieve different levels of service such that the service provider that operates the management system can provide quality-of-service guarantees to its customers significantly enhances a distributed data processing system.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for managing resources within a distributed data processing system, the method comprising the steps of:

receiving, at a resource manager, a lease request from a resource requester to lease a requested resource for a requested lease period at a particular level of service;

in response to receiving the lease request, securing leases on a logical circuit of resources through the distributed data processing system wherein:

obtaining a data oath that represents the logical circuit of resources through the distributed data processing system between the resource requester and the requested resource, wherein the data path is determined by a dynamic discovery process of devices within the distributed data processing system;

sending, by the resource manager, multiple lease requests for the requested lease period to respective multiple resource managers for multiple requested resources along the data path, wherein use of the requested resource requires use of the multiple requested resources; and receiving, at the resource manager, lease grants for the multiple requested resources from the respective multiple resource managers; and in response to securing leases on the logical circuit of resources, sending a lease grant for the requested resource from the resource manager to the resource requester.

2. The method of claim 1 further comprising:

detecting an oversubscribed condition on the requested resource; and in response to the detected oversubscribed condition, reducing a lease period for the lease grant.

3. The method of claim 1 further comprising:

detecting an error condition; and in response to the detected error condition, reducing a lease period for the lease grant.

4. An apparatus for managing resources within a distributed data processing system, the apparatus comprising:

first receiving means for receiving, at a resource manager, a lease request from a resource requester to lease a requested resource for a requested lease period at a particular level of service;

securing means for securing, in response to receiving the lease request, leases on a logical circuit of resources through the distributed data processing system, wherein:

obtaining means for obtaining a data path that represents the logical circuit of resources through the distributed data processing system between the resource requester and the requested resource, wherein the data path is determined by a dynamic discovery process of devices within the distributed data processing system;

first sending means for sending, by the resource manager, multiple lease requests for the requested lease period to respective multiple resource managers for multiple requested resources along the data path, wherein use of the requested resource requires use of the multiple requested resources; and second receiving means for receiving, at the resource manager, lease grants for the multiple requested resources from the respective multiple resource managers; and second sending means for sending, in response to securing leases on the logical circuit of resources, a lease grant for the requested resource from the resource manager to the resource requester.

5. The apparatus of claim 4 further comprising:

second detecting means for detecting an oversubscribed condition on the requested resource; and second reducing means for reducing a lease period for the lease grant in response to the detected oversubscribed condition.

6. The apparatus of claim 4 further comprising:

third detecting means for detecting an error condition; and third reducing means for reducing a lease period for the lease grant in response to the detected error condition.

7. A computer program product on a computer readable medium for use in a data processing system for managing resources within the distributed data processing system, the computer program product comprising:

first instructions for receiving, at a resource manager, a lease request from a resource requester to lease a requested resource for a requested lease period at a particular level of service;

instructions for securing, in response to receiving the lease request, leases on a logical circuit of resources through the distributed data processing system, wherein:

instructions for obtaining a data path that represents the logical circuit of resources through the distributed data processing system between the resource requester and the requested resource, wherein the data path is determined by a dynamic discovery process of devices within the distributed data processing system;

first instructions for sending, by the resource manager, multiple lease requests for the requested lease period to respective multiple resource managers for multiple requested resources along the data path, wherein use of the requested resource requires use of the multiple requested resources; and second instructions for receiving, at the resource manager, lease grants for the multiple requested resources from the respective multiple resource managers; and second instructions for sending, in response to securing leases on the logical circuit of resources, a lease grant for the requested resource from the resource manager to the resource requester.

8. The computer program product of claim 7 further comprising:

second instructions for detecting an oversubscribed condition on the requested resource; and second instructions for reducing a lease period for the lease grant in response to the detected oversubscribed condition.

9. The computer program product of claim 7 further comprising:

third instructions for detecting an error condition; and third instructions for reducing a lease period for the lease grant in response to the detected error condition.

10. A network comprising:

first receiving means for receiving, at a resource manager, a lease request from a resource requester to lease a requested resource for a requested lease period at a particular level of service;

securing means for securing, in response to receiving the lease request, leases on a logical circuit of resources through the network, wherein:

obtaining means for obtaining a data path that represents the logical circuit of resources through the network between the resource requester and the requested resource, wherein the data path is determined by a dynamic discovery process of devices within the network;

first sending means for sending, by the resource manager, multiple lease requests for the requested lease period to respective multiple resource managers for multiple requested resources along the data path, wherein use of the requested resource requires use of the multiple requested resources; and second receiving means for receiving, at the resource manager, lease grants for the multiple requested resources from the respective multiple resource managers; and second sending means for sending, in response to securing leases on the logical circuit of resources, a lease grant for the requested resource from the resource manager to the resource requester.

11. The network of claim 10, further comprising:

second detecting means for detecting an oversubscribed condition on the requested resource; and second reducing means for reducing a lease period for the lease grant in response to the detected oversubscribed condition.

12. The network of claim 10 further comprising:

third detecting means for detecting an error condition; and third reducing means for reducing a lease period for the lease grant in response to the detected error condition.

* * * * *